(12) United States Patent
Fuglevand

(10) Patent No.: US 7,326,480 B2
(45) Date of Patent: Feb. 5, 2008

(54) FUEL CELL POWER SYSTEM AND METHOD OF CONTROLLING A FUEL CELL POWER SYSTEM

(75) Inventor: William A. Fuglevand, Spokane, WA (US)

(73) Assignee: Relion, Inc., Spokane, WA (US)

( * ) Notice: Subject to any disclaimer, the term of this patent is extended or adjusted under 35 U.S.C. 154(b) by 723 days.

(21) Appl. No.: 10/830,929

(22) Filed: Apr. 22, 2004

(65) Prior Publication Data

US 2004/0197608 A1 Oct. 7, 2004

Related U.S. Application Data

(63) Continuation-in-part of application No. 09/916,791, filed on Jul. 26, 2001, now Pat. No. 6,743,536, which is a continuation-in-part of application No. 09/577,407, filed on May 17, 2000, now Pat. No. 6,468,682.

(51) Int. Cl.
 *H01M 16/00* (2006.01)
 *H01M 8/04* (2006.01)

(52) U.S. Cl. .............................. 429/9; 429/13; 429/23

(58) Field of Classification Search .................. 429/9, 429/13, 23; 320/101
See application file for complete search history.

(56) References Cited

U.S. PATENT DOCUMENTS

| | | |
|---|---|---|
| 2,852,554 A | 9/1958 | England |
| 3,498,844 A | 3/1970 | Sanderson |
| 3,507,702 A | 4/1970 | Sanderson |
| 3,528,858 A | 9/1970 | Hodgdon |
| 3,554,803 A | 1/1971 | Poirier ........................ 136/86 |
| 3,623,913 A | 11/1971 | Adlhart et al. |
| 3,808,534 A | 4/1974 | Summers et al. ........... 340/249 |
| 3,823,358 A | 7/1974 | Rey |
| 3,964,930 A | 6/1976 | Reiser |
| 3,969,145 A | 7/1976 | Grevstad et al. |
| 3,975,913 A | 8/1976 | Erickson ...................... 60/645 |
| 4,000,003 A | 12/1976 | Baker et al. |
| 4,024,036 A | 5/1977 | Nakamura et al. .......... 204/129 |
| 4,035,551 A | 7/1977 | Grevstad ..................... 429/44 |
| 4,130,693 A | 12/1978 | Van den Berghe et al. ... 429/41 |
| 4,142,024 A | 2/1979 | Van den Berghe et al. ... 429/41 |
| 4,178,418 A | 12/1979 | Croset et al. ................. 429/27 |

(Continued)

FOREIGN PATENT DOCUMENTS

DE 25 51936 11/1975

(Continued)

OTHER PUBLICATIONS

Chul-Hawan et al., Journal of Polymer Science, vol. 34, pp. 2709-2714, (1996), no month.

(Continued)

*Primary Examiner*—Stephen J. Kalafut
(74) *Attorney, Agent, or Firm*—Wells St. John P.S.

(57) ABSTRACT

A fuel cell power system includes a fuel cell which has an optimal voltage; an energy storage device having a nominal voltage substantially similar to the optimal voltage of the fuel cell; and an electrical switch that, in operation, selectively electrically couples the fuel cell and the energy storage device to charge the energy storage device. A method includes providing a fuel cell having a nominal voltage; providing an energy storage device having a nominal voltage which is substantially similar to the nominal voltage of the fuel cell and electrically coupling the energy storage device to a load; and selectively electrically coupling the fuel cell to the energy storage device to substantially maintain the energy storage device above a predetermined voltage threshold.

20 Claims, 15 Drawing Sheets

U.S. PATENT DOCUMENTS

| | | | |
|---|---|---|---|
| 4,185,131 A | 1/1980 | Goller et al. | 427/113 |
| 4,192,906 A | 3/1980 | Maru | 429/13 |
| 4,219,443 A | 8/1980 | Klinedinst et al. | 252/425 |
| 4,276,355 A | 6/1981 | Kothmann et al. | 429/26 |
| 4,287,232 A | 9/1981 | Goller et al. | 427/113 |
| 4,435,252 A | 3/1984 | Kadija | 204/11 |
| 4,463,065 A | 7/1984 | Hegedus et al. | 429/33 |
| 4,469,579 A | 9/1984 | Covitch et al. | 204/283 |
| 4,476,198 A | 10/1984 | Ackerman et al. | 429/32 |
| 4,478,917 A | 10/1984 | Fujita et al. | 429/33 |
| 4,500,612 A | 2/1985 | Fujii et al. | 429/26 |
| 4,510,211 A | 4/1985 | Struthers | 429/18 |
| 4,562,124 A | 12/1985 | Ruka | 429/30 |
| 4,598,028 A | 7/1986 | Rossing et al. | 429/30 |
| 4,629,537 A | 12/1986 | Hsu | 204/15 |
| 4,647,359 A | 3/1987 | Lindstrom | 204/294 |
| 4,648,955 A | 3/1987 | Maget | 204/258 |
| 4,661,411 A | 4/1987 | Martin et al. | 428/421 |
| 4,670,702 A | 6/1987 | Yamada et al. | 320/21 |
| 4,686,158 A | 8/1987 | Nishi et al. | 429/26 |
| 4,702,971 A | 10/1987 | Isenberg | 429/31 |
| 4,724,191 A | 2/1988 | Kuriakose et al. | 429/316 |
| 4,728,584 A | 3/1988 | Isenberg | 429/31 |
| 4,749,632 A | 6/1988 | Flandermeyer et al. | 429/12 |
| 4,755,376 A | 7/1988 | Marianowski | 429/16 |
| 4,767,518 A | 8/1988 | Maskalick | 204/242 |
| 4,769,296 A | 9/1988 | Sterzel | 429/12 |
| 4,769,297 A | 9/1988 | Reiser et al. | 429/17 |
| 4,770,955 A | 9/1988 | Ruhl | 429/33 |
| 4,778,579 A * | 10/1988 | Levy et al. | 429/17 X |
| 4,795,536 A | 1/1989 | Young et al. | 204/129 |
| 4,795,683 A | 1/1989 | McElroy | 429/13 |
| 4,797,185 A | 1/1989 | Polak et al. | 204/129 |
| 4,797,190 A | 1/1989 | Peck | 204/294 |
| 4,804,592 A | 2/1989 | Vanderborgh | 429/33 |
| 4,816,036 A | 3/1989 | Kotchick | 29/623 |
| 4,818,637 A | 4/1989 | Molter et al. | 429/15 |
| 4,818,735 A | 4/1989 | Fujiki et al. | 501/134 |
| 4,824,741 A | 4/1989 | Kunz | 429/26 |
| 4,826,741 A | 5/1989 | Aldhart et al. | 429/19 |
| 4,826,742 A | 5/1989 | Reiser | 429/33 |
| 4,847,172 A | 7/1989 | Maskalick et al. | 429/30 |
| 4,849,253 A | 7/1989 | Maricle | 427/115 |
| 4,851,303 A | 7/1989 | Madou et al. | 429/13 |
| 4,863,813 A | 9/1989 | Dyer | 429/33 |
| 4,876,115 A | 10/1989 | Raistrick | 427/115 |
| 4,883,497 A | 11/1989 | Claar et al. | 29/623 |
| 4,894,355 A | 1/1990 | Takeuchi et al. | 502/101 |
| 4,927,793 A | 5/1990 | Hori et al. | 501/134 |
| 4,943,494 A | 7/1990 | Riley | 429/30 |
| 4,948,680 A | 8/1990 | Madou et al. | 429/13 |
| 4,973,530 A | 11/1990 | Vanderborgh et al. | 429/13 |
| 4,973,531 A | 11/1990 | Zaima et al. | 429/37 |
| 4,985,315 A | 1/1991 | Lemoine | 429/33 |
| 4,988,582 A | 1/1991 | Dyer | 429/30 |
| 4,994,331 A | 2/1991 | Cohen | 429/17 |
| 5,035,961 A | 7/1991 | Riley | 429/30 |
| 5,035,962 A | 7/1991 | Jensen | 429/40 |
| 5,037,525 A | 8/1991 | Badwal | 204/421 |
| 5,045,414 A | 9/1991 | Bushnell et al. | 429/17 |
| 5,047,298 A | 9/1991 | Perry, Jr. et al. | 429/17 |
| 5,049,459 A | 9/1991 | Akagi | 429/33 |
| 5,059,497 A | 10/1991 | Prince et al. | 429/193 |
| 5,069,985 A | 12/1991 | Cohen et al. | 429/26 |
| 5,069,987 A | 12/1991 | Gordon | 429/31 |
| 5,084,144 A | 1/1992 | Reddy et al. | 205/104 |
| 5,106,706 A | 4/1992 | Singh et al. | 429/31 |
| 5,114,803 A | 5/1992 | Ishihara et al. | 429/30 |
| 5,122,425 A | 6/1992 | Yoshida et al. | 429/33 |
| 5,130,210 A | 7/1992 | Iwasaki et al. | 429/33 |
| 5,132,193 A | 7/1992 | Reddy et al. | 429/13 |
| 5,143,801 A | 9/1992 | Bates | 429/33 |
| 5,149,601 A | 9/1992 | Shiratori et al. | 429/30 |
| 5,154,986 A | 10/1992 | Takechi et al. | 429/23 |
| 5,154,987 A | 10/1992 | Hash et al. | 429/33 |
| 5,162,167 A | 11/1992 | Minh et al. | 429/30 |
| 5,164,060 A | 11/1992 | Eisman et al. | 204/282 |
| 5,169,731 A | 12/1992 | Yoshimura et al. | 29/30 |
| 5,176,967 A | 1/1993 | Ishihara et al. | 429/31 |
| 5,186,806 A | 2/1993 | Clark | 204/265 |
| 5,187,025 A | 2/1993 | Kelland et al. | 429/33 |
| 5,188,910 A | 2/1993 | Ishihara et al. | 429/31 |
| 5,190,834 A | 3/1993 | Kendall | 429/31 |
| 5,192,627 A | 3/1993 | Perry, Jr. et al. | 429/17 |
| 5,200,278 A | 4/1993 | Watkins et al. | 429/24 |
| 5,200,279 A | 4/1993 | Draper et al. | 429/30 |
| 5,213,911 A | 5/1993 | Bloom et al. | 429/33 |
| 5,217,822 A | 6/1993 | Yoshida et al. | 429/33 |
| 5,219,673 A | 6/1993 | Kaun | 429/32 |
| 5,223,353 A | 6/1993 | Ohsawa et al. | 429/192 |
| 5,232,794 A | 8/1993 | Krumpelt et al. | 429/30 |
| 5,234,722 A | 8/1993 | Ito et al. | 427/453 |
| 5,234,777 A | 8/1993 | Wilson | 429/33 |
| 5,242,764 A | 9/1993 | Dhar | 429/30 |
| 5,244,753 A | 9/1993 | Taniguchi et al. | 429/33 |
| 5,246,792 A | 9/1993 | Watanabe | 429/33 |
| 5,248,566 A | 9/1993 | Kumar et al. | 429/33 |
| 5,252,410 A | 10/1993 | Wilkinson et al. | 429/33 |
| 5,256,499 A | 10/1993 | Minh et al. | 429/33 |
| 5,262,249 A | 11/1993 | Beal et al. | 429/26 |
| 5,264,299 A | 11/1993 | Krasij et al. | 429/30 |
| 5,266,419 A | 11/1993 | Yamada | 429/30 |
| 5,266,421 A | 11/1993 | Townsend et al. | 429/314 |
| 5,270,131 A | 12/1993 | Diethelm et al. | 429/34 |
| 5,272,017 A | 12/1993 | Swathirajan et al. | 429/33 |
| 5,273,838 A | 12/1993 | Draper et al. | 429/31 |
| 5,279,906 A | 1/1994 | Yoshimura et al. | 429/30 |
| 5,281,490 A | 1/1994 | Nishioka et al. | 429/33 |
| 5,286,579 A | 2/1994 | Akagi | 429/33 |
| 5,290,323 A | 3/1994 | Okuyama | 29/623 |
| 5,290,642 A | 3/1994 | Minh et al. | 429/33 |
| 5,292,599 A | 3/1994 | Soma et al. | 429/30 |
| 5,292,600 A | 3/1994 | Kaufman | 429/39 |
| 5,298,235 A | 3/1994 | Worrell et al. | 429/33 |
| 5,302,269 A | 4/1994 | Eisman et al. | 204/252 |
| 5,304,430 A | 4/1994 | Ludwig | 429/17 |
| 5,306,574 A | 4/1994 | Singh et al. | 429/13 |
| 5,308,712 A | 5/1994 | Seike et al. | 429/30 |
| 5,312,700 A | 5/1994 | Ishida | 429/30 |
| 5,316,869 A | 5/1994 | Perry, Jr. et al. | 429/19 |
| 5,316,871 A | 5/1994 | Swathirajan et al. | 429/33 |
| 5,330,859 A | 7/1994 | McPheeters et al. | 429/33 |
| 5,330,860 A | 7/1994 | Grot et al. | 429/42 |
| 5,334,463 A | 8/1994 | Tajima et al. | |
| 5,336,570 A | 8/1994 | Dodge | 429/31 |
| 5,338,622 A | 8/1994 | Hsu et al. | 429/26 |
| 5,342,704 A | 8/1994 | Vasilow et al. | 429/31 |
| 5,342,705 A | 8/1994 | Minh et al. | 429/32 |
| 5,344,721 A | 9/1994 | Sonai et al. | 429/20 |
| 5,346,780 A | 9/1994 | Suzuki | 429/42 |
| 5,350,641 A | 9/1994 | Mogensen et al. | 429/30 |
| 5,350,643 A | 9/1994 | Imahashi et al. | 429/33 |
| 5,354,626 A | 10/1994 | Kobayashi et al. | 429/30 |
| 5,356,728 A | 10/1994 | Balachandran et al. | 429/8 |
| 5,356,730 A | 10/1994 | Minh et al. | 429/32 |
| 5,358,620 A | 10/1994 | Golorin et al. | 204/421 |
| 5,358,735 A | 10/1994 | Kawasaki et al. | 427/115 |
| 5,358,799 A | 10/1994 | Gardner | 429/26 |
| 5,364,711 A | 11/1994 | Yamada et al. | 429/15 |
| 5,366,818 A | 11/1994 | Wilkinson et al. | 429/13 |
| 5,368,951 A | 11/1994 | Shiratori et al. | 429/30 |
| 5,372,895 A | 12/1994 | Sato et al. | 429/30 |
| 5,372,896 A | 12/1994 | Binder et al. | 429/33 |
| 5,382,478 A | 1/1995 | Chow et al. | 429/26 |

| | | | |
|---|---|---|---|
| 5,385,792 A | 1/1995 | Shiratori et al. ............... 429/32 |
| 5,395,704 A | 3/1995 | Barnett et al. ................. 429/30 |
| 5,395,705 A | 3/1995 | Door et al. ................... 429/42 |
| 5,401,589 A | 3/1995 | Palmer et al. |
| 5,403,461 A | 4/1995 | Tuller et al. ................ 204/252 |
| 5,403,675 A | 4/1995 | Ogata et al. .................... 429/33 |
| 5,407,758 A | 4/1995 | Greiner et al. ................ 429/33 |
| 5,419,980 A | 5/1995 | Okamoto et al. ............. 429/32 |
| 5,449,697 A | 9/1995 | Noaki et al. .................. 521/27 |
| 5,470,671 A | 11/1995 | Fletcher et al. .............. 429/26 |
| 5,500,292 A | 3/1996 | Muranaka et al. .......... 429/209 |
| 5,521,020 A | 5/1996 | Dhar ......................... 429/142 |
| 5,523,175 A | 6/1996 | Beal et al. .................... 429/30 |
| 5,523,177 A | 6/1996 | Kosek et al. ................. 429/40 |
| 5,525,436 A | 6/1996 | Savinell et al. .............. 429/30 |
| 5,532,072 A | 7/1996 | Spaeh et al. .................. 429/34 |
| 5,534,362 A | 7/1996 | Okamoto et al. ............. 429/32 |
| 5,547,777 A | 8/1996 | Richards .................... 429/32 |
| 5,561,202 A | 10/1996 | Helmer-Metzmann et al. ........................... 525/471 |
| 5,599,638 A | 2/1997 | Surampudi et al. ........... 429/33 |
| 5,599,639 A | 2/1997 | Sansone et al. ............... 429/33 |
| 5,607,785 A | 3/1997 | Tozawa et al. ............... 429/33 |
| 5,624,769 A | 4/1997 | Li et al. ....................... 429/32 |
| 5,639,516 A | 6/1997 | Dirven et al. ............... 427/421 |
| 5,654,109 A | 8/1997 | Plowman et al. ............. 429/13 |
| 5,677,074 A | 10/1997 | Serpico et al. ................ 429/43 |
| 5,686,197 A | 11/1997 | Nishida et al. ............... 429/30 |
| 5,707,755 A | 1/1998 | Grot ............................ 429/40 |
| 5,726,105 A | 3/1998 | Grasso et al. ............... 442/136 |
| 5,750,281 A | 5/1998 | Washington et al. .......... 429/39 |
| 5,759,712 A | 6/1998 | Hockaday .................... 429/30 |
| 5,763,113 A | 6/1998 | Meltser et al. ................ 429/13 |
| 5,773,160 A | 6/1998 | Wilkinson et al. ............ 429/13 |
| 5,776,625 A | 7/1998 | Kaufman et al. ............. 429/30 |
| 5,783,324 A | 7/1998 | Binder et al. ................. 429/31 |
| 5,783,325 A | 7/1998 | Cabasso et al. ............... 429/42 |
| 5,789,091 A | 8/1998 | Wozniczka et al. ........... 429/12 |
| 5,798,186 A | 8/1998 | Fletcher et al. ............... 429/13 |
| 5,804,326 A | 9/1998 | Chow et al. .................. 429/26 |
| 5,858,567 A | 1/1999 | Spear, Jr. et al. ............. 429/12 |
| 5,863,671 A | 1/1999 | Spear, Jr. et al. ............. 429/12 |
| 5,863,672 A | 1/1999 | Ledjeff et al. ................ 429/26 |
| 5,863,673 A | 1/1999 | Campbell et al. ............. 429/44 |
| 5,869,202 A | 2/1999 | Marchetti .................... 429/30 |
| 5,874,182 A | 2/1999 | Wilkinson et al. ............ 429/30 |
| 5,916,699 A | 6/1999 | Thomas et al. |
| 5,925,322 A | 7/1999 | Werth ........................ 422/170 |
| 5,931,658 A | 8/1999 | Sederquist et al. .......... 431/207 |
| 5,935,726 A | 8/1999 | Chow et al. .................. 429/13 |
| 5,945,232 A | 8/1999 | Ernst et al. ................... 429/32 |
| 5,989,741 A | 11/1999 | Bloomfield et al. .......... 429/32 |
| 5,993,987 A | 11/1999 | Wozniczka et al. ........... 429/37 |
| 6,007,931 A | 12/1999 | Fuller et al. .................. 429/13 |
| 6,007,932 A | 12/1999 | Steyn ........................... 429/31 |
| 6,007,933 A | 12/1999 | Jones .......................... 429/38 |
| 6,010,798 A | 1/2000 | Hammerschmidt et al. ... 429/30 |
| 6,015,634 A | 1/2000 | Bonville, Jr. et al. ......... 429/26 |
| 6,024,848 A | 2/2000 | Dufner et al. ............... 204/252 |
| 6,025,084 A | 2/2000 | Kawasaki et al. ............ 429/30 |
| 6,028,414 A | 2/2000 | Chouinard et al. |
| 6,030,718 A | 2/2000 | Fuglevand et al. ........... 429/26 |
| 6,045,934 A | 4/2000 | Enami ......................... 429/30 |
| 6,051,192 A | 4/2000 | Maston et al. ............... 422/110 |
| 6,051,329 A | 4/2000 | Fasano et al. ................ 429/30 |
| 6,051,330 A | 4/2000 | Fasano et al. ................ 429/30 |
| 6,051,331 A | 4/2000 | Spear, Jr. et al. ............. 429/34 |
| 6,080,501 A | 6/2000 | Kelley et al. ................. 429/31 |
| 6,096,449 A | 8/2000 | Fuglevand et al. |
| 6,127,058 A | 10/2000 | Pratt et al. .................... 429/30 |
| 6,210,823 B1 | 4/2001 | Hatoh et al. ................. 429/30 |
| 6,214,484 B1 | 4/2001 | Hauer |
| 6,255,008 B1 | 7/2001 | Iwase |
| 6,326,763 B1 | 12/2001 | King et al. |
| 6,468,682 B1 | 10/2002 | Fuglevand et al. |
| 2005/0048335 A1* | 3/2005 | Fields et al. ............... 429/23 X |

FOREIGN PATENT DOCUMENTS

| GB | 2 129237 A | 5/1984 |
|---|---|---|
| GB | 2 286 482 | 8/1995 |
| JP | 57-60670 | 4/1982 |
| JP | 57-80675 | 5/1982 |
| JP | 57-107570 | 7/1982 |
| WO | WO94/15377 | 7/1994 |
| WO | WO 01/17952 | 3/2000 |
| WO | WO 00/26980 | 5/2000 |

OTHER PUBLICATIONS

Tager et al; Polymer Science vol. 33, 1991 pp. 282-287, no month.
Wilson et al., Private Paper 1996, 8 pages, no month.
Lam-Leung et al; Journal of Applied Polymer Science, vol. 57, 1995, pp. 1373-1379, no month.
Dowling et al; Macromolecules 1991, pp. 4131-4237, no month.
Thedoropoulouse et al; Journal of Applied Polymer Science, vol. 46, 1992, pp. 1461-1465, no month.
Chainey et al; Journal of Polymer Science, 1989, vol. 27, pp. 3187-3199, no month.
Tovbin et al; Russian Journal of Physical Chemistry, vol. 67, 1993, pp. 471-474, no month.
Krever et al; Chemical Material 1996, vol. 8, pp. 610-641, no month.
Wieczorek et al; Electrochimica Acta, vol. 40 (1995), pp. 2327-2330, no month.
Poinsignon et al; Materials Science and Engineering (1989), pp. 31-37, no month.
Solomin; Polymer Science USSR vol. 34, 1992, pp. 274-275, no month.
Zawodzinski et al; Solid State Ionics, vol. 60 (1993), pp. 199-211, no month.
Ticianelli et al; Journal of Applied Electro-Chemistry, vol. 21 (1991), pp. 597-605, no month.
Savodogo et al; Journal of the Electro Chemical Society, vol. 141, No. 8,1994, pp. L92-L95 (Aug.).
Staiti et al; Journal of Applied Electrochemistry; vol. 22 (1992), pp. 663-667, no month.
Gao et al; Electrochimica Acta; vol. 37, No. 8, pp. 1327-1332 (1992), no month.
Mosdale et al; Solid State Ionics; vol. 61 (1993), pp. 251-255, no month.
Uchida et al; Journal of the Electrochemical Society; No. 142 (1995), pp. 463-468 (Feb.).
Shukla et al; Journal of Applied Electrochemistry; vol. 19 (1989), pp. 383-386, no month.
Hamnett et al; Journal of Applied Electrochemistry, vol. 21, (1991), pp. 982-985, no month.
Ticianelli et al; Journal of Electro Chemical Society; vol. 135, (1988), pp. 2209-2214, no month.
Prater et al; Journal of Power Sources; vol. 37 (1992), pp. 181-188, no month.
Prater et al; Journal of Power Sources; vol. 29, (1990), pp. 239-250, no month.
Svinivasan et al; Journal of Power Sources; vol. 22 (1988), pp. 359-375, no month.
Ticianelli et al; Journal of Electroanalytical Chemistry; vol. 251 (1988), pp. 275-295, no month.
Moore et al; Macromolecules; vol. 22 (1984), 3594-3599, no month.
U.S. Dept. of Energy; Fuel Cells A Handbook (Revision 3); Jan. 1994, pp. 1-1-9-14.
Fuel Cell Systems; American Chemical Society Symposia, Apr. 6-7, 1964, pp. 18-201.
Fuel Cell Systems II; American Chemical Society Symposia, Sep. 12-14, 1967, pp. 1-80.

* cited by examiner

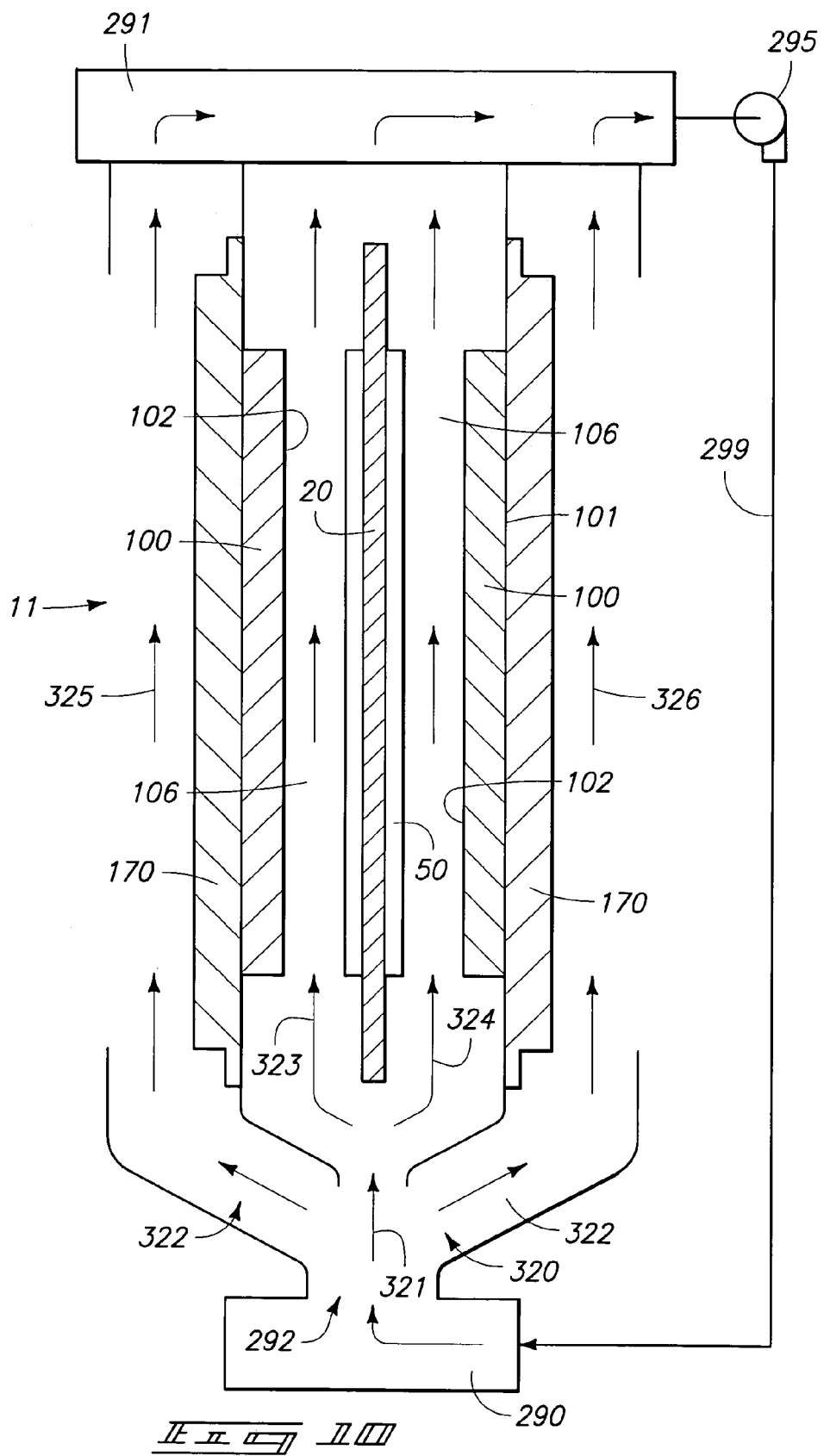

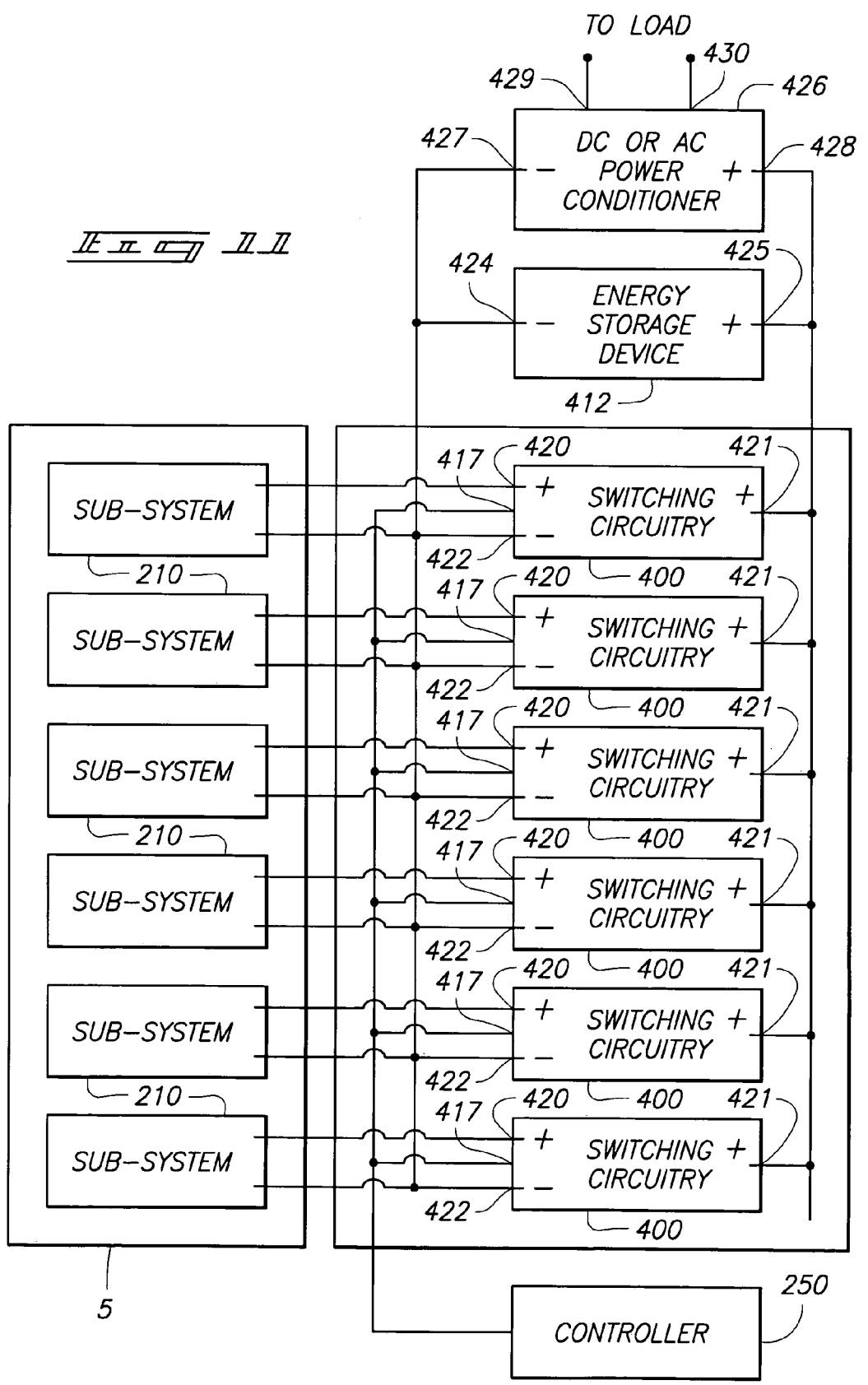

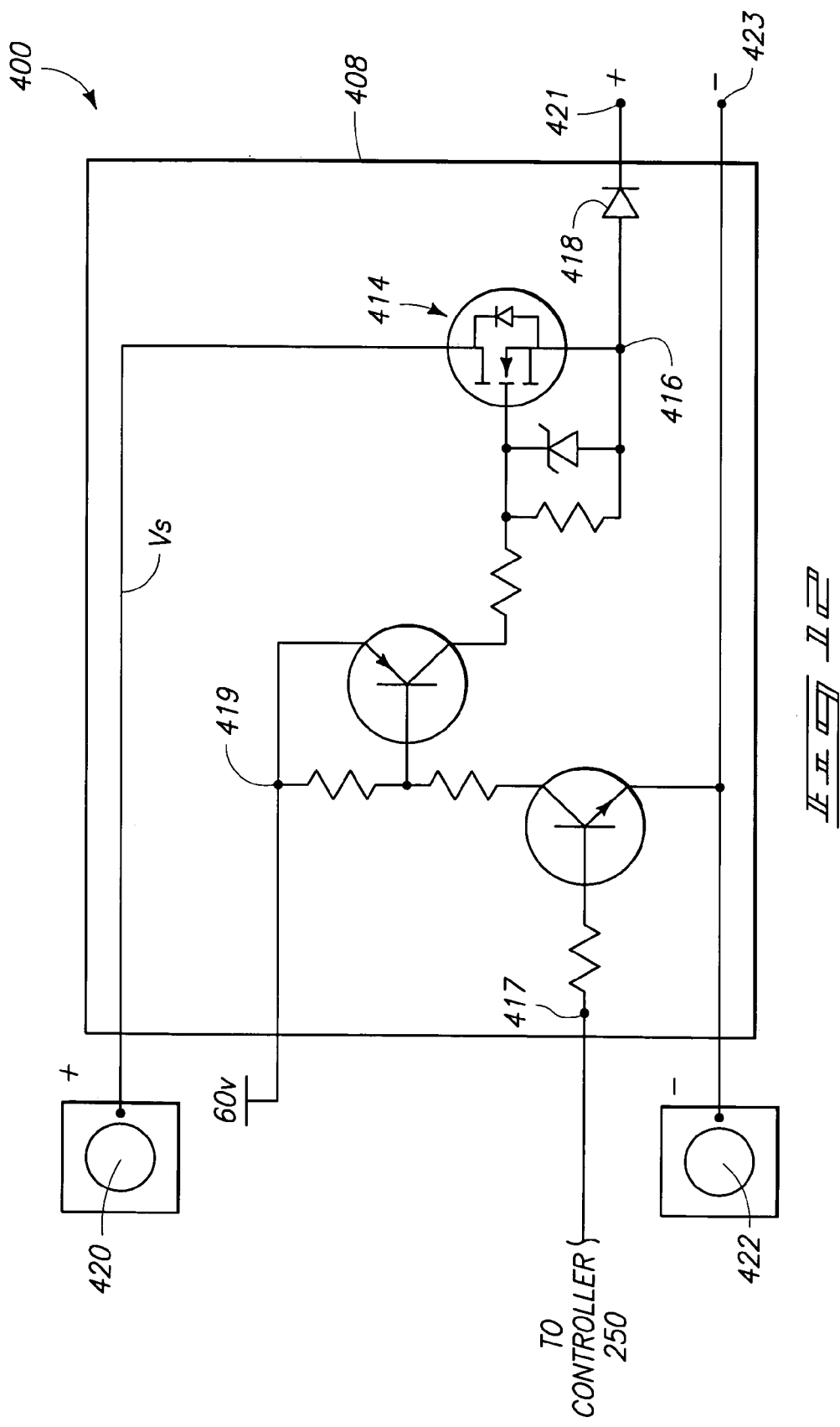

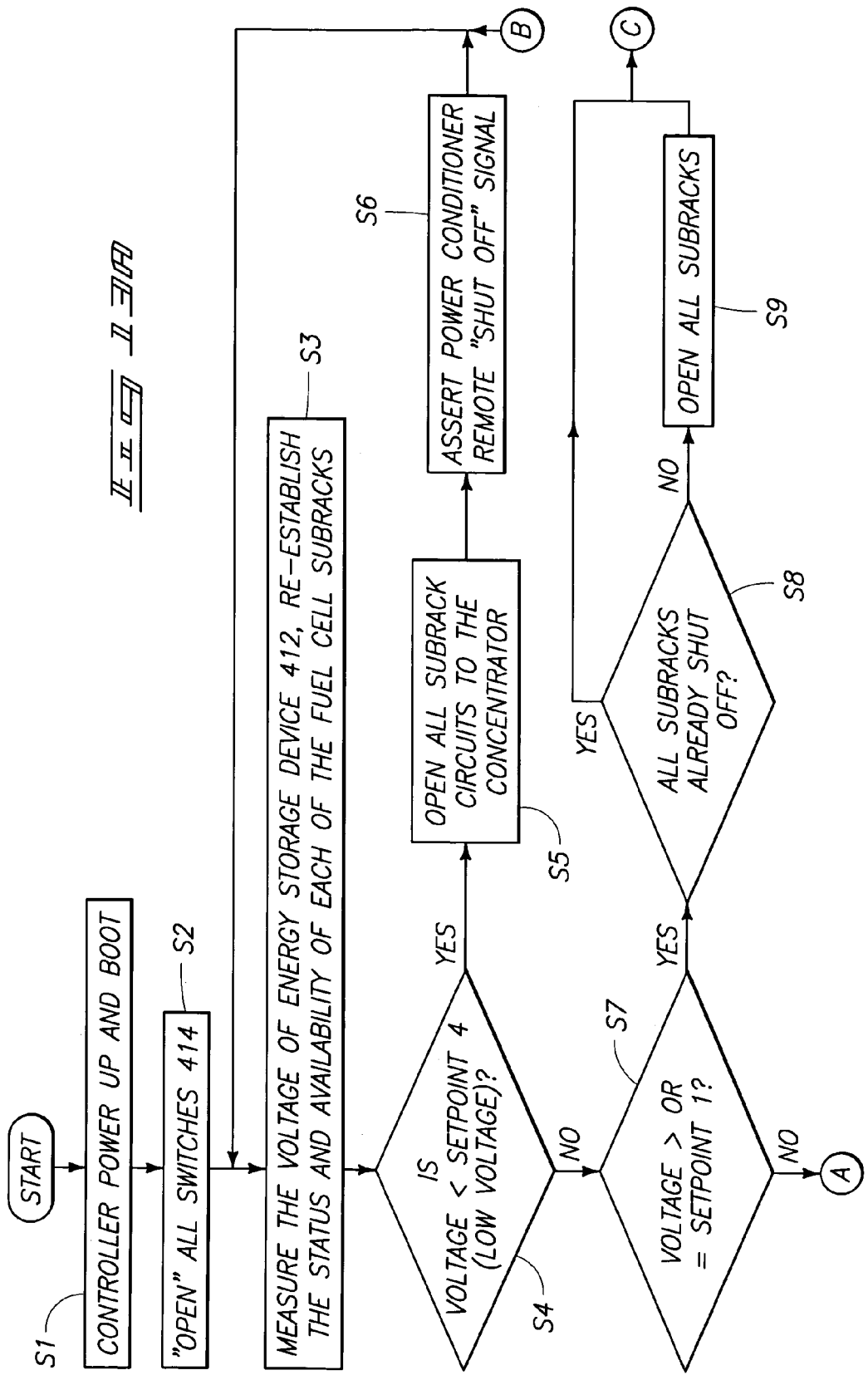

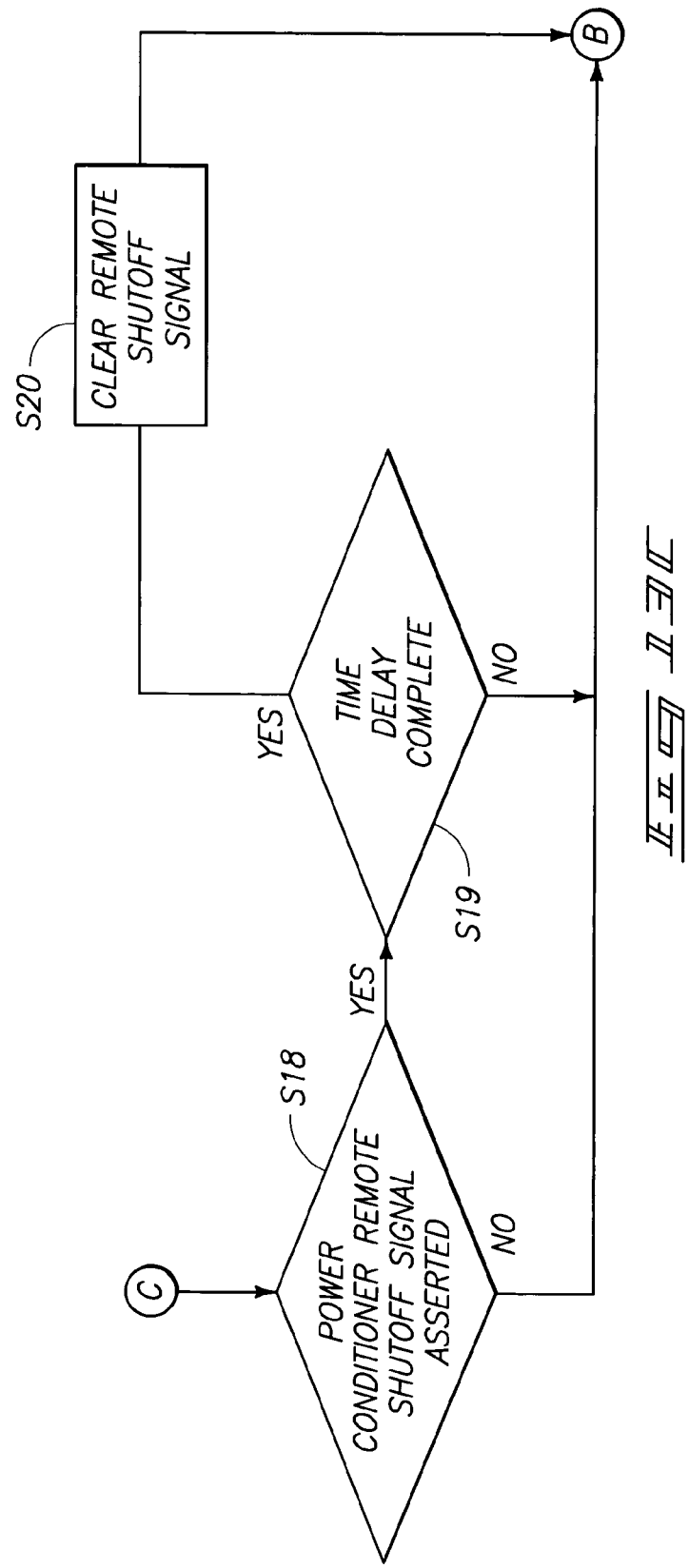

FUEL CELL POWER SYSTEM AND METHOD OF CONTROLLING A FUEL CELL POWER SYSTEM

RELATED PATENT DATA

This application is a continuation-in-part of U.S. patent application Ser. No. 09/916,791 and which was filed on Jul. 26, 2001, now U.S. Pat. No. 6,743,536, and which is further a continuation-in-part of U.S. patent application Ser. No. 09/577,407, filed on May 17, 2000, now U.S. Pat. No. 6,468,682, issued Oct. 22, 2002, both of which are incorporated by reference herein.

TECHNICAL FIELD

The invention relates to an ion exchange membrane fuel cell and a method of controlling an ion exchange membrane fuel cell. The invention also relates to an ion exchange membrane fuel cell power system incorporating a fuel cell module and a method for improving performance characteristics of such a fuel cell power system. The invention also relates to methods and apparatus for supplying electrical energy to a load and compensating for variations in a load powered by a fuel cell system.

BACKGROUND OF THE INVENTION

Fuel cell systems are known in the art. A fuel cell is an electrochemical device which reacts hydrogen and oxygen which is usually supplied from the air, to produce electricity and water. The basic process is highly efficient, and for those fuel cells fueled directly by hydrogen, pollution free. Further, since fuel cells can be assembled into stacks of various sizes, power systems have been developed to produce a wide range of electrical power outputs and thus can be employed in numerous industrial applications. The teachings of prior art patents, U.S. Pat. Nos. 6,030,718, and 6,096,449, are incorporated by reference herein.

A fuel cell produces an electromotive force by reacting fuel and oxygen at respective electrode interfaces which share a common electrolyte. In the case of a proton exchange membrane (PEM) type fuel cell, hydrogen gas is introduced at a first electrode where it reacts electrochemically in the presence of a catalyst to produce electrons and protons. The electrons are circulated from the first electrode to a second electrode through an electrical circuit connected between the electrodes. Further, the protons pass through a membrane of solid, polymerized electrolyte (a proton exchange membrane or PEM) to the second electrode. Simultaneously, an oxidant, such as oxygen gas, (or air), is introduced to the second electrode where the oxidant reacts electrochemically in the presence of the catalyst and is combined with the electrons from the electrical circuit and the protons (having come across the proton exchange membrane) thus forming water and completing the electrical circuit. The fuel-side electrode is designated the anode and the oxygen-side electrode is identified as the cathode. The external electric circuit conveys electrical current and can thus extract electrical power from the cell. The overall PEM fuel cell reaction produces electrical energy which is the sum of the separate half cell reactions occurring in the fuel cell less its internal losses.

Since a single PEM fuel cell produces a useful voltage of only about 0.45 to about 0.7 volts D.C. under a load, practical PEM fuel cell plants have been built from multiple cells stacked together such that they are electrically connected in series. In order to reduce the number of parts and to minimize costs, rigid supporting/conducting separator plates often fabricated from graphite or special metals have been utilized. This is often described as bipolar construction. More specifically, in these bipolar plates one side of the plate services the anode, and the other the cathode. Such an assembly of electrodes, membranes, and the bipolar plates are referred to as a stack. Practical stacks have heretofore consisted of twenty or more cells in order to produce the direct-current voltages necessary for efficient power conversion.

The economic advantages of designs based on stacks which utilize bipolar plates are compelling. However, this design has various disadvantages which have detracted from its usefulness. For example, if the performance of a single cell in a stack declines significantly or fails, the entire stack, which is held together in compression with tie bolts, must be taken out of service, disassembled, and repaired. In traditional fuel cell stack designs, the fuel and oxidant are directed by internal manifolds to the electrodes. Cooling for the stack is provided either by the reactants, natural convection radiation, and possibly supplemental cooling channels and/or cooling plates. Also included in the prior art stack designs are current collectors, cell-to-cell seals, insulation, piping, and various instrumentation for use in monitoring cell performance. The fuel cell stack, housing, and associated hardware make up the operational fuel cell plant. Such prior art designs are unduly large, cumbersome, and quite heavy. Any commercially useful PEM fuel cell designed in accordance with the prior art could not be manipulated by hand because of these characteristics.

Fuel cells are, as a general matter, relatively slow to respond to increased load demands. When a fuel cell is used in a power distribution system, loads may vary over time. At some times, there may be spikes in the load. Because a certain amount of time is normally required to start up a fuel cell, additional fuel cells or fuel cell subsystems cannot be instantaneously brought on-line to handle instantaneous spikes in the load. At the same time, a spike in the load that exceeds the capacity of an on-line fuel cell can potentially damage the fuel cell. Thus, fuel cell overcapacity may be provided in prior art systems in order to handle short temporary spikes in demand. This type of design is inefficient and wasteful.

Fuel cells have, from time to time, been used in conjunction with charge storage devices, such as batteries, which can provide a more instantaneous power supply for given application needs. In most instances, the direct current (DC) power which a fuel cell power system produces must be converted to alternating current (AC) for most applications. In this regard, an inverter is normally used to convert the fuel cells DC power to AC. As a general matter, inverters generally function within a specified DC input voltage range. In some previous applications, the fuel cell and charge storage device have been coupled to an inverter which functions at the optimal voltage of either the fuel cell or the charge storage devices. In this arrangement, the voltage of the fuel cell was raised or lowered as appropriate, to provide optimum functioning of the system. Still further, altering the voltage resulted in decreased efficiency by way of heat loss incumbent in the conversion process.

The present invention addresses many of the shortcomings attendant with the prior art practices. For example, previous prior art applications which provide both a fuel cell and a charge storage device in the arrangement discussed above, have been unduly complex and have experienced as noted above, decreased efficiency by way of heat losses caused by the lowering of the voltages generated by the fuel cell to make the fuel cell voltage match, as closely as possible, the voltage capacity of the charge storage devices used with same.

Further, designers have long sought after means by which current density in self-humidified PEM fuel cells can be enhanced while simultaneously not increasing the balance of plant requirements for these same devices.

Accordingly, an improved ion exchange membrane fuel cell, is described in combination with a method for controlling same which addresses the perceived shortcomings associated with the prior art designs and practices while avoiding the shortcomings individually associated therewith.

Attention is directed toward the following patents, which are incorporated herein by reference: U.S. Pat. No. 6,028,414 to Chouinard et al.; U.S. Pat. No. 5,916,699 to Thomas et al.; and U.S. Pat. No. 5,401,589 to Palmer et al. U.S. Pat. No. 5,401,589 to Palmer et al. discloses a rechargeable battery provided in parallel with a fuel cell electrical output together with appropriate charging, switching and control means so that a sudden increase in power demand can be met by both the fuel cell and battery working together and/or a sudden decrease in power demand may be met by charging of the battery.

U.S. Pat. No. 5,916,699 to Thomas et al. discloses an energy storage system including a first energy storage device, such as a secondary or rechargeable battery, and a second energy storage device, such as a capacitor, fuel cell or flywheel. The second energy storage device provides intermittent energy bursts to satisfy the power requirements of, for example, pulsed power communication devices.

U.S. Pat. No. 6,028,414 to Chouinard et al. discloses a fuel cell stand-by energy supply system incorporating storage battery(ies) for supplying electrical power, the battery(ies) being recharged by the fuel cell.

BRIEF DESCRIPTION OF THE DRAWINGS

Preferred embodiments of the invention are described below with reference to the following accompanying drawings.

FIG. 10 is a fragmentary, schematic representation of an ion exchange membrane fuel cell module, and associated power systems.

FIG. 12 is a schematic representation of an exemplary configuration of power conditioning circuitry.

FIGS. 13A, 13B and 13C together define a flowchart illustrating logic performed by a controller that controls the power conditioning circuitry associated with each subrack or sub-system to selectively couple each subrack or sub-system to the energy storage device.

DETAILED DESCRIPTION OF THE PREFERRED EMBODIMENTS

Figure 1:
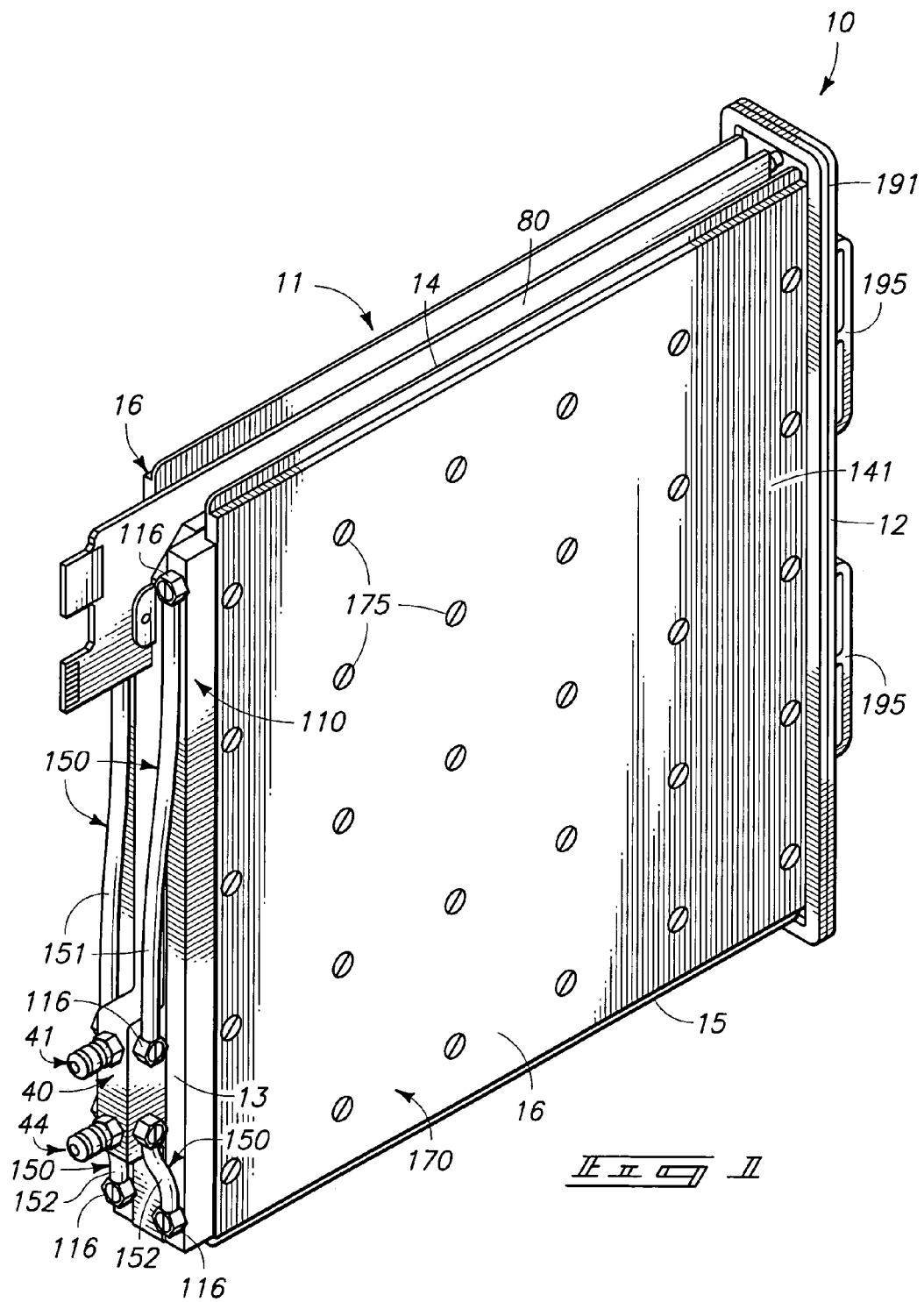
FIG. 1 is a perspective, side elevation view of an ion exchange membrane fuel cell module of a fuel cell power system embodying the present invention.

This disclosure of the invention is submitted in furtherance of the constitutional purposes of the U.S. Patent Laws "to promote the progress of science and useful arts" (Article 1, Section 8).

One aspect of the invention provides a fuel cell power system comprising a fuel cell which has an optimal voltage; an energy storage device having a nominal voltage substantially similar to the optimal voltage of the fuel cell; and an electrical switch that, in operation, selectively electrically couples the fuel cell and the energy storage device to charge the energy storage device.

Another aspect of the invention is to provide an energy storage device, such as an ultra-capacitor or battery, coupled to a load. The battery and ultra-capacitor are useful, for example, for absorbing spikes or other changes in the load. The battery and ultra-capacitor are supplied with electricity generated by a fuel cell which is made up of subracks or individual fuel cell sub-systems. Circuitry is provided which measures or monitors the voltage of the battery and/or the ultra-capacitor and selectively couples individual fuel cell subracks or sub-systems to the battery and/or ultra-capacitor in response to the measured or monitored voltage of the battery.

Another aspect of the present invention relates to a fuel cell power system comprising a fuel cell which, in operation, converts chemical energy into direct current electrical energy, the fuel cell being defined by a plurality of independently operable fuel cell sub-systems; a DC bus; a switching circuit electrically coupled with the fuel cell sub-systems and configured to independently selectively couple the fuel cell sub-systems to the DC bus; and an energy storage device such as a battery and/or ultra-capacitor electrically coupled with the DC bus and configured to be coupled to a load, and wherein the switching circuit selectively electrically couples a selectable number of the fuel cell sub-systems to the DC bus to supply direct current electrical energy to the energy storage device to charge the energy storage device.

Yet another aspect of the invention relates to a fuel cell power system comprising a plurality of fuel cells, having substantially similar nominal voltages; an energy storage device such as a battery and/or ultra-capacitor having a nominal voltage substantially similar to that of each of the fuel cells; and electrical switching circuitry electrically coupled to the fuel cells and the energy storage device, and which is configured to electrically couple a selectable number of the fuel cells to the energy storage device to maintain the voltage of the energy storage device above a predetermined voltage.

Still another aspect of the invention relates to a fuel cell power system comprising a fuel cell which has a nominal operating voltage; an energy storage device having a nominal voltage substantially similar to the nominal operating voltage of the fuel cell; an electrical switch selectively coupling the fuel cell to the energy storage device; and a controller coupled in voltage sensing relation relative to the fuel cell, and the energy storage device, and further coupled in controlling relation relative to the electrical switch, the controller selectively controlling the electrical switch to selectively electrically couple the fuel cell to the energy storage device to maintain the voltage of the energy storage device above a predetermined threshold.

Yet still another aspect of the present invention relates to a fuel cell power system comprising a power conditioning device having a DC input, and having an electrical output, and which is configured to be coupled to a load; an energy storage device such as a battery and/or ultra-capacitor coupled to the DC input; a plurality of fuel cell sub-systems; and electrical circuitry for measuring the voltage of the energy storage device and selectively couple a selectable number of the fuel cell sub-systems to the energy storage device in response to the measured voltage of the energy storage device.

Still another aspect of the present invention relates to a method comprising: (a) measuring the voltage of the energy storage device; (b) determining if the measured voltage is less than a first threshold and, if so, proceeding to step (c) and, if not, proceeding to step (d); (c) de-coupling all the sub-systems from the energy storage device; (d) determining if the measured voltage is greater than or equal to a second threshold and, if so, proceeding to step (e) and, if not, proceeding to step (g); (e) determining if all sub-systems are de-coupled from the energy storage device and, if so, proceeding to step (a) and, if not, proceeding to step (f); (f) decoupling all of the sub-systems from the energy storage device; (g) determining if the measured voltage is greater than or equal to a third threshold and, if so, proceeding to step (h) and, if not, proceeding to step (j); (h) determining if all sub-systems are de-coupled from the energy storage device and, if so, proceeding to step (a) and, if not, proceeding to step (j); (i) decoupling one of the sub-systems coupled to the energy storage device from the energy storage device (j) determining if the measured voltage is greater than or equal to a fourth threshold and, if so, proceeding to step (k) and, if not, proceeding to step (m); (k) determining if all sub-systems are coupled to the energy storage device and, if so, proceeding to step (a) and, if not, proceeding to step (l); (l) coupling one of the sub-systems de-coupled from the energy storage device to the energy storage device; (m) determining if all sub-systems are coupled to the energy storage device and, if so, proceeding to step (a) and, if not, proceeding to step (n); and (n) coupling all sub-systems to the energy storage device.

A further aspect of the present invention relates to a method comprising providing a fuel cell having a nominal voltage; providing an energy storage device having a nominal voltage which is substantially similar to the nominal voltage of the fuel cell and electrically coupling the energy storage device to a load; and selectively electrically coupling the fuel cell to the energy storage device to substantially maintain the energy storage device above a predetermined voltage threshold.

Another aspect of the present invention relates to a method comprising providing a plurality of independently operable fuel cells which convert chemical energy into direct current electrical energy; providing an energy storage device; coupling the energy storage device to a load; monitoring the voltage of the energy storage device; and varying the number of the fuel cells coupled to the energy storage device based upon the voltage of the energy storage device.

Figure 11B:
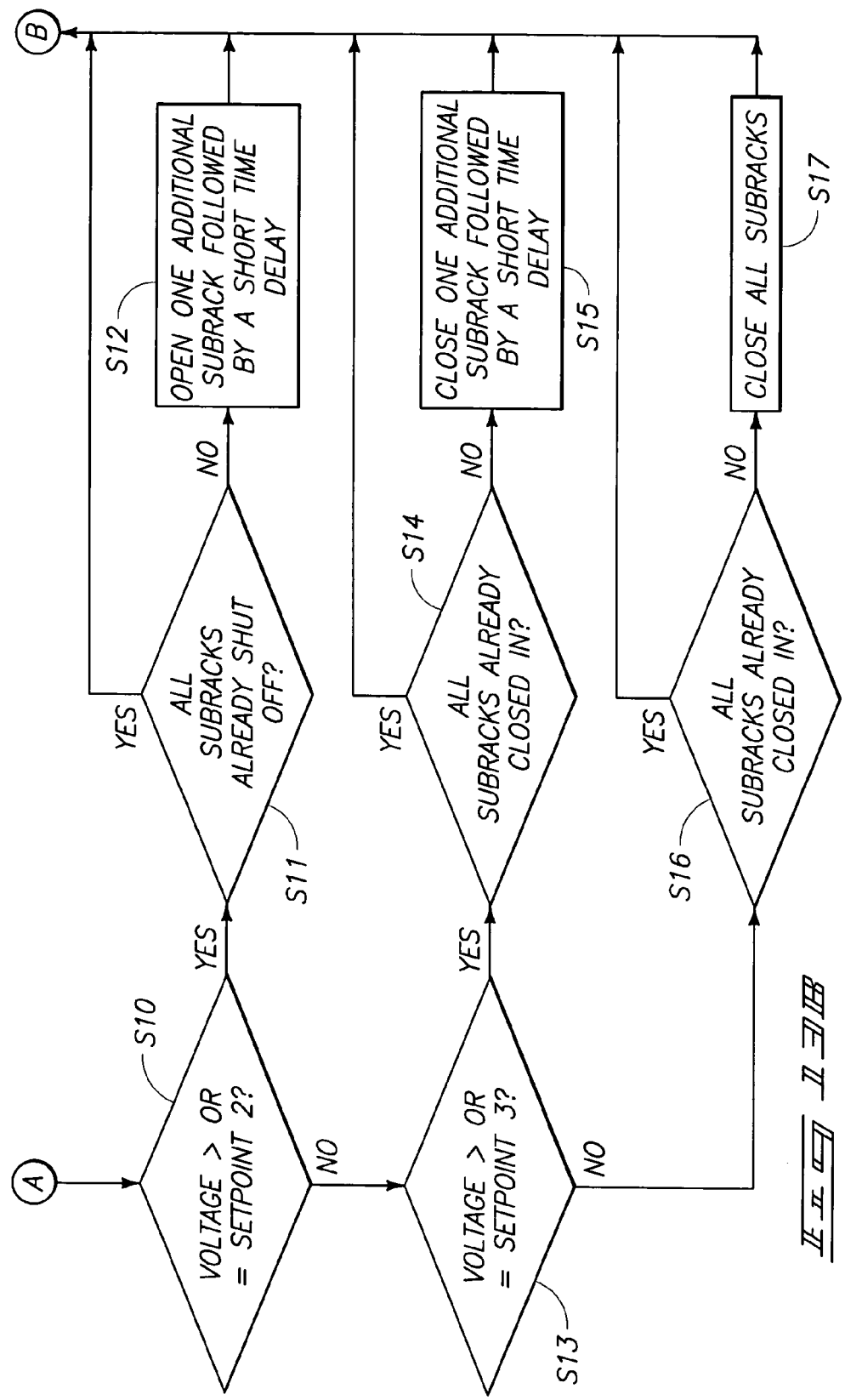
FIG. 11 is a block diagram illustrating a plurality of fuel cell subracks or sub-systems of the type shown in FIG. 8 and respectively selectively coupled to an energy storage device via circuitry such as is shown in FIG. 12.

The ion exchange membrane fuel cell power system 5 (FIG. 11) of the present invention is made up of a plurality of fuel cell modules 10, only one of which is shown in FIG. 1. As seen in FIG. 11 the ion exchange membrane fuel cell power system 5 comprises a plurality of subsystems 210. Each subsystem or subrack 210 includes a given number of hand-manipulatable modules 10 (FIG. 1). The modules 10 have a main body 11 which has a forward edge 12; an opposite, rearward edge 13; top and bottom surfaces or edges 14 and 15; and opposite sidewalls generally indicated by the numeral 16. Each facet of the main body of the module 11 will be discussed in greater detail hereinafter. Yet further it should be understood that the present invention could be employed with conventional stack-like technology wherein the individual subsystems comprise fuel cell stacks arranged in a manner which is consistent with the further teachings of this application. Moreover, the present invention works particularly well with the fuel cell construction found in U.S. Pat. No. 6,030,718, the teachings of which are incorporated by reference herein.

Figure 2:
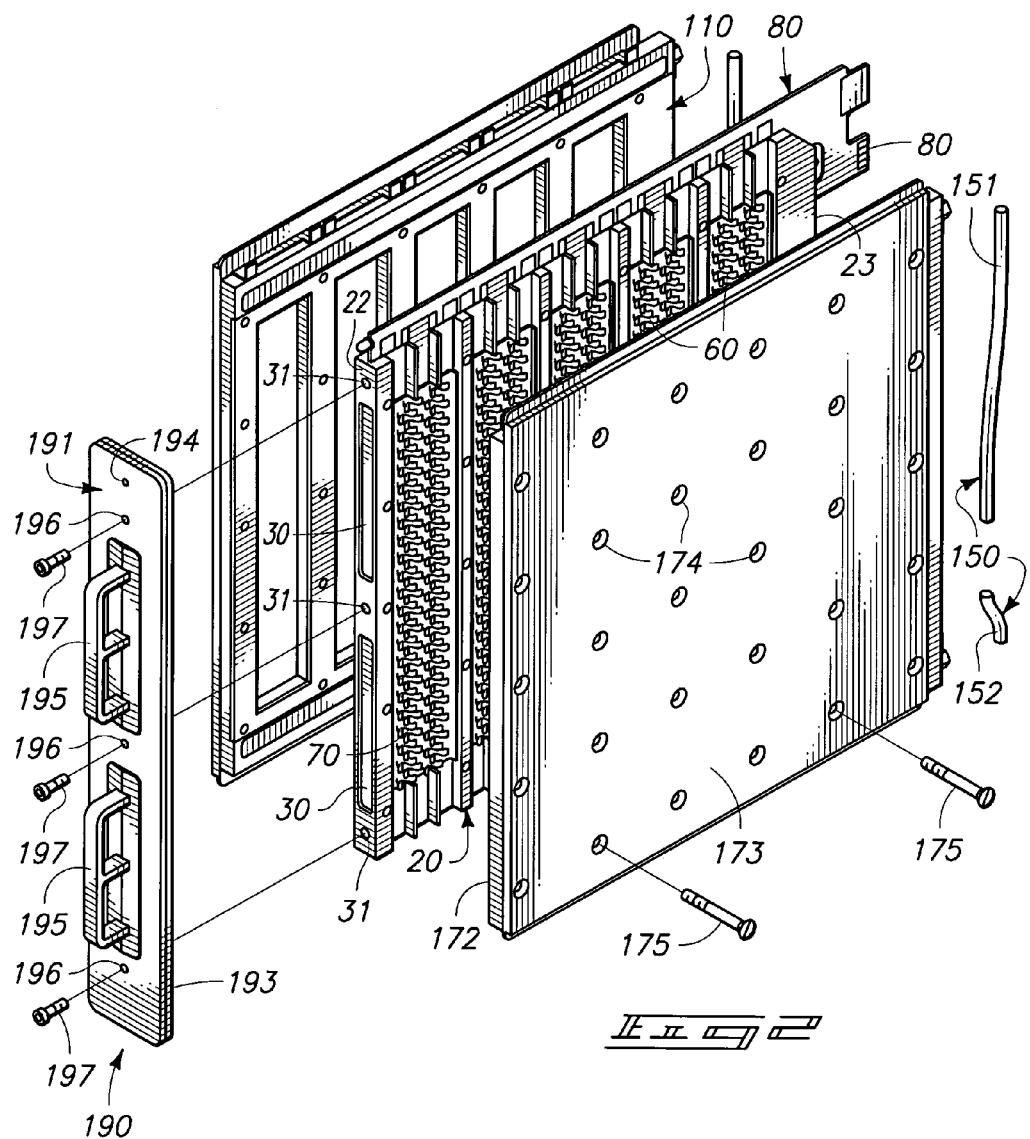
FIG. 2 is a perspective, exploded, side elevation view of an ion exchange membrane fuel cell module.
Figure 3:
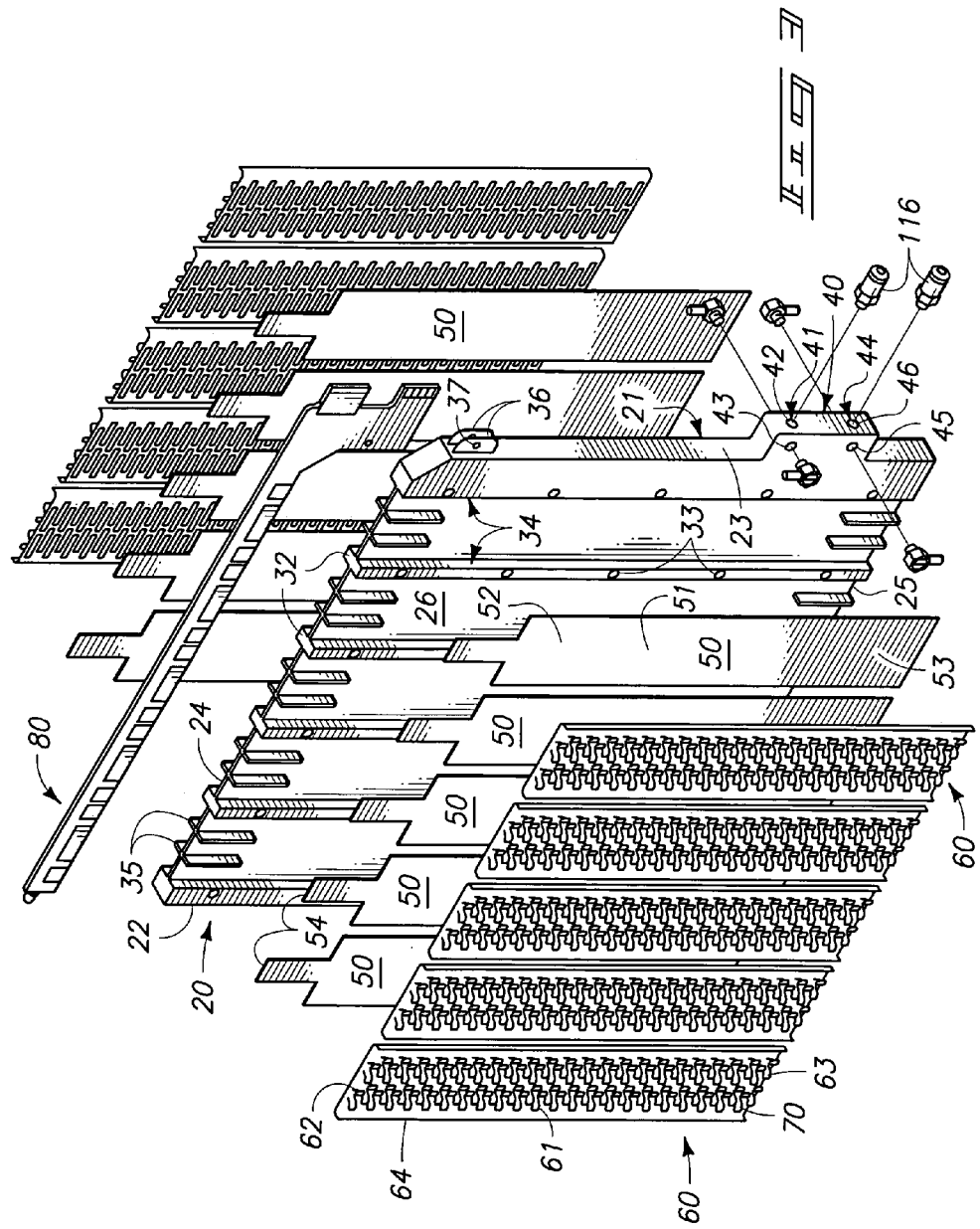
FIG. 3 is a perspective, partial, exploded, side elevation view of an ion exchange membrane fuel cell module.

As best seen in FIGS. 2 and 3, the main body of the module 11 includes a nonconductive, dielectric support member generally indicated by the numeral 20. The support member can be fashioned out of various synthetic polymeric substrates. The support member has (see FIG. 3) a main body 21, which is defined by a forward peripheral edge 22; a rearward peripheral edge 23; a top peripheral edge 24; an opposite, bottom peripheral edge 25; and opposite sidewalls generally indicated by the numeral 26.

As best seen in FIG. 2, a pair of recessed channels 30 are formed in the forward peripheral edge 22. Further, a plurality of fastener receiving passageways or apertures 31 are also formed in the forward peripheral edge 22. Yet further, and as seen in FIG. 3, a plurality of spaced ribs 32 are borne by, or made integral with the respective sidewalls 26 and are disposed in spaced relation, one to the other. Fastener passageways or apertures 33 are formed through each of the ribs. Further, cavities 34 are defined between the respective ribs 32 on each sidewall. The cavities 34 formed on each of the sidewalls are disposed in substantially opposed relation one to the other. This is seen in FIG. 3.

Further, as best seen in FIG. 3, orientation members 35 are disposed between each of the ribs 32 and define a space therebetween. A pair of mounting tabs 36 are provided in spaced relationship, one to the other, on the rearward peripheral edge 23 of the main body 21. A pair of substantially coaxially aligned apertures 37 are individually formed in each of the mounting tabs 36 and are operable to receive a fastener therethrough.

A fuel coupling 40 is made integral with or forms a portion of the rearward peripheral edge 23 of the support member 20. The fuel coupling 40 includes a fuel delivery passageway 41 which is substantially T shaped and which is defined by an intake end 42 and a pair of exhaust ends labeled 43. Additionally, the fuel coupling also includes an exhaust passageway 44 which is also substantially T shaped and which is defined by a pair of intake ends 45, and an exhaust end 46. The operation of the fuel coupling 40 will be discussed in greater detail hereinafter.

As best seen in FIGS. 2 and 3, individual conductor plates which are generally designated by the numeral 50 are matingly received within the individual cavities 34 which are defined by the support member 20. The conductor plates which are fabricated from an electrically conductive substrate, have a substantially planar main body 51, which has a first end 52, and an opposite, second end 53. The main body 51 further has a conductive tab 54 which extends outwardly relative to the first end 52, and which is oriented between the individual orientation members 35. The conductive tab extends substantially normally outwardly relative to the top peripheral edge 24 of the support member 20. As will be recognized, the main body 51 matingly rests between the individual ribs 32 which define, in part, the respective cavities 34.

As best seen in the exploded view of FIG. 3, a cathode current collector is generally designated by the numeral 60, and rests in ohmic electrical contact with the main body 51 of the individual conductor plates 50. The cathode current collector, which is fabricated from an electrically conductive substrate, has a main body 61 which has opposite first and second ends 62 and 63, respectively. The cathode current collector simultaneously performs the functions of current collection, force application and heat dissipation. Still further, the main body 61 of the current collector 60 is defined by a peripheral edge 64.

Figure 4:
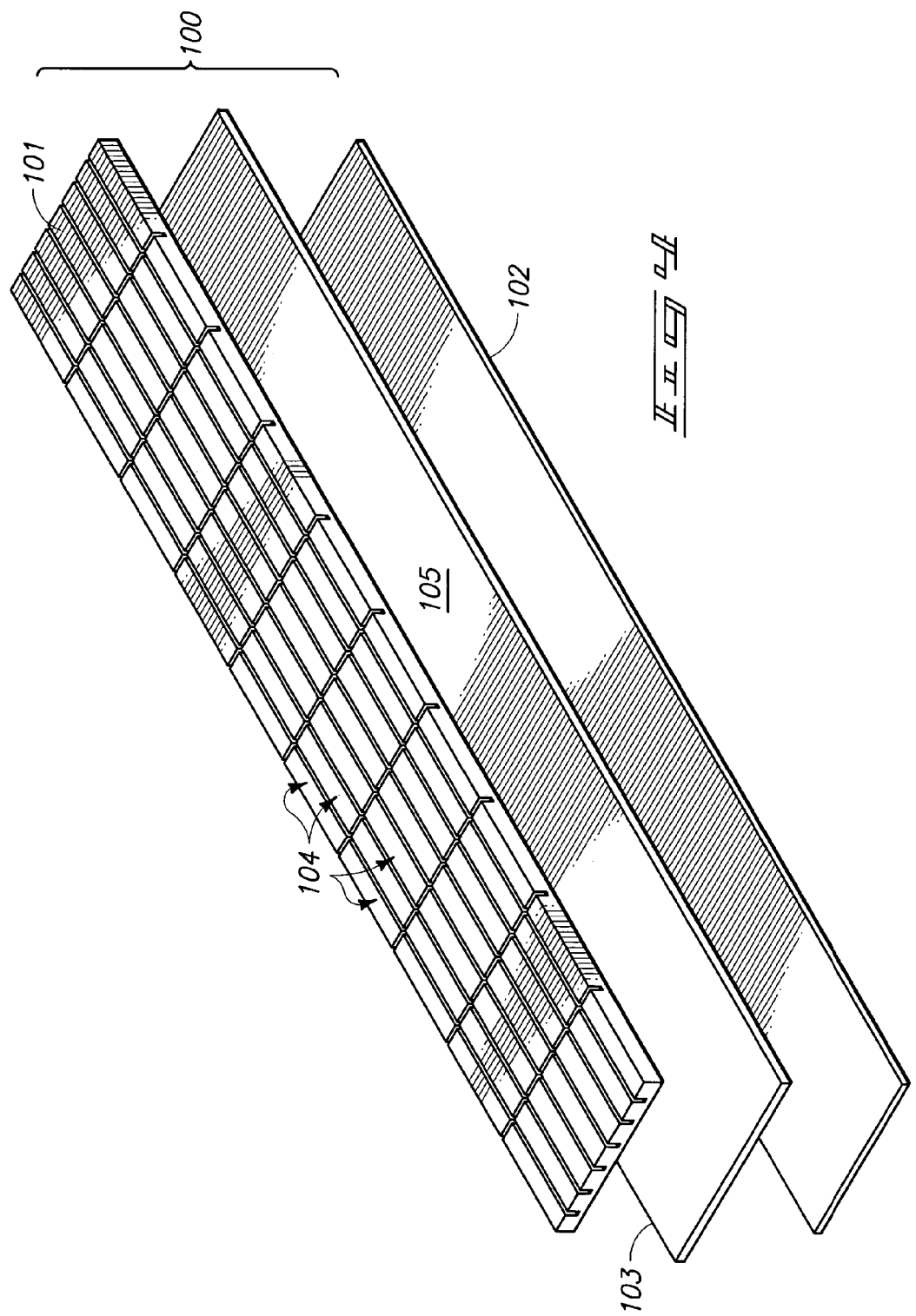
FIG. 4 is a fragmentary, perspective, greatly enlarged, exploded view of a membrane electrode diffusion assembly employed with the ion exchange membrane fuel cell module.
Figure 7:
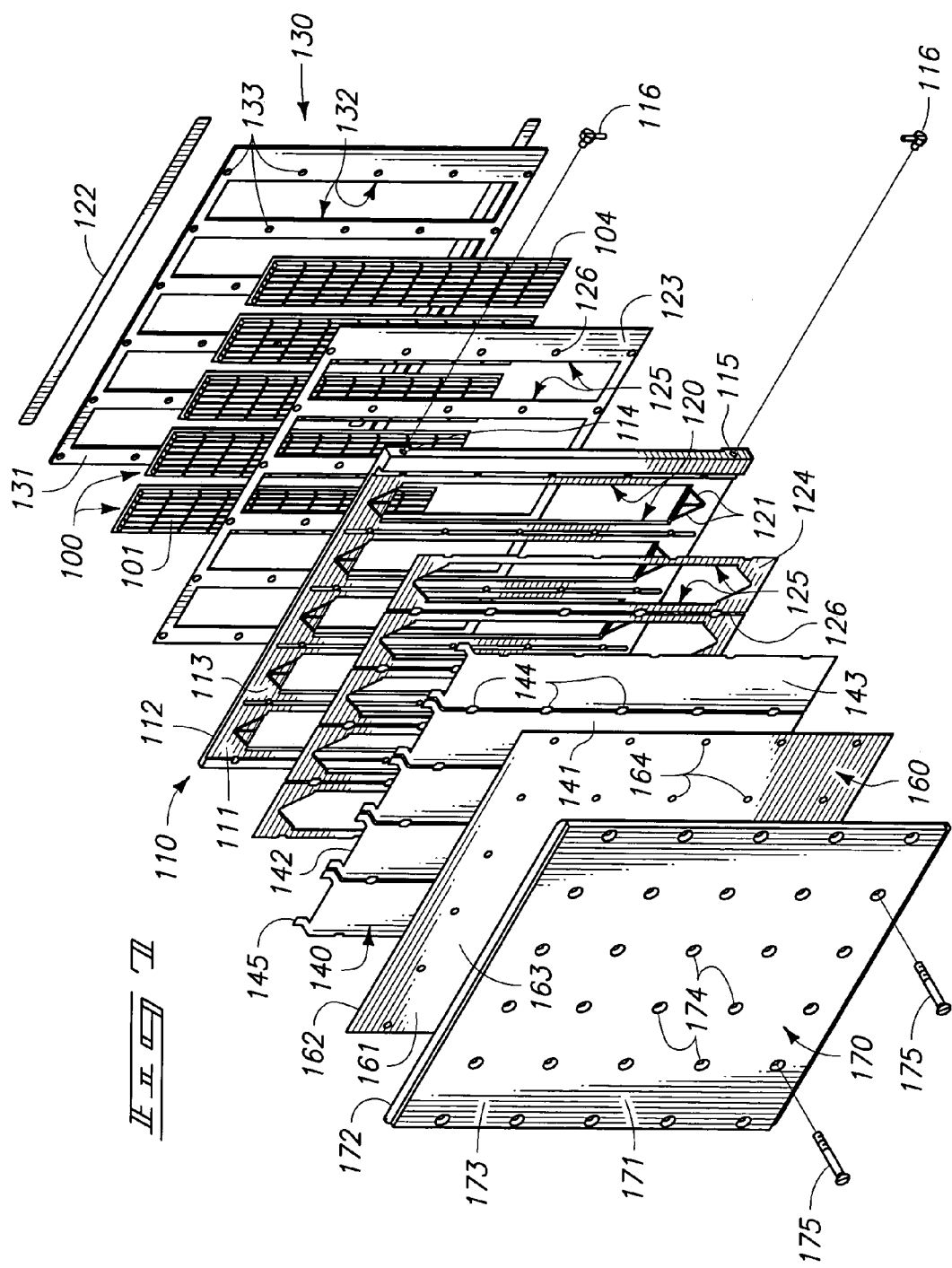
FIG. 7 is a second, perspective, partial, exploded view of a portion of the ion exchange membrane fuel cell module of the present invention.

As best seen in the exploded view of FIGS. 4 and 7, the ion exchange membrane fuel cell module 10 includes a plurality of membrane electrode diffusion assemblies generally indicated by the numeral 100. Each of the membrane electrode diffusion assemblies have an anode side 101, and an opposite cathode side 102. Still further, each of the membrane electrode diffusion assemblies is defined by a peripheral edge 103, and further has formed in its anode side, a plurality of interlinking channels 104. The membrane electrode diffusion assembly 100, as noted above, is formed of a solid ion conducting membrane 105 which is sealably mounted or received in each of the respective cavities 34. In this arrangement, the cathode side 102 of each membrane electrode diffusion assembly 100 is held in spaced relation relative to the support member 20 by deformable electrically conductive members 70 (FIGS. 2 and 3) of the cathode current collector 60. This spacial arrangement, which is provided by the cathode current collector, facilitates, in part, heat dissipation from the module 11. As described, above, the membrane electrode diffusion assembly 100; associated cathode current collector 60; and support member 20, in combination, define a cathode air passageway 106 therebetween (FIG. 10). The construction of a suitable membrane electrode diffusion assembly was described in our earlier U.S. Pat. No. 6,030,718. This earlier patent is incorporated by reference herein, and further discussion regarding the construction of the membrane electrode diffusion assembly is not undertaken herein.

As will be appreciated, from a study of FIG. 10, the cathode air passageway 106 is defined or otherwise oriented on each side 26 of the support member 20. Therefore, the main body of the module 11 has a bifurcated cathode air flow. As will be appreciated, while the earlier described membrane electrode diffusion assembly was directed to a proton exchange membrane, the fuel cell power system 10 of the present invention is not limited solely to a type having proton exchange membranes, but also may utilize anion exchange membranes.

Figure 5:
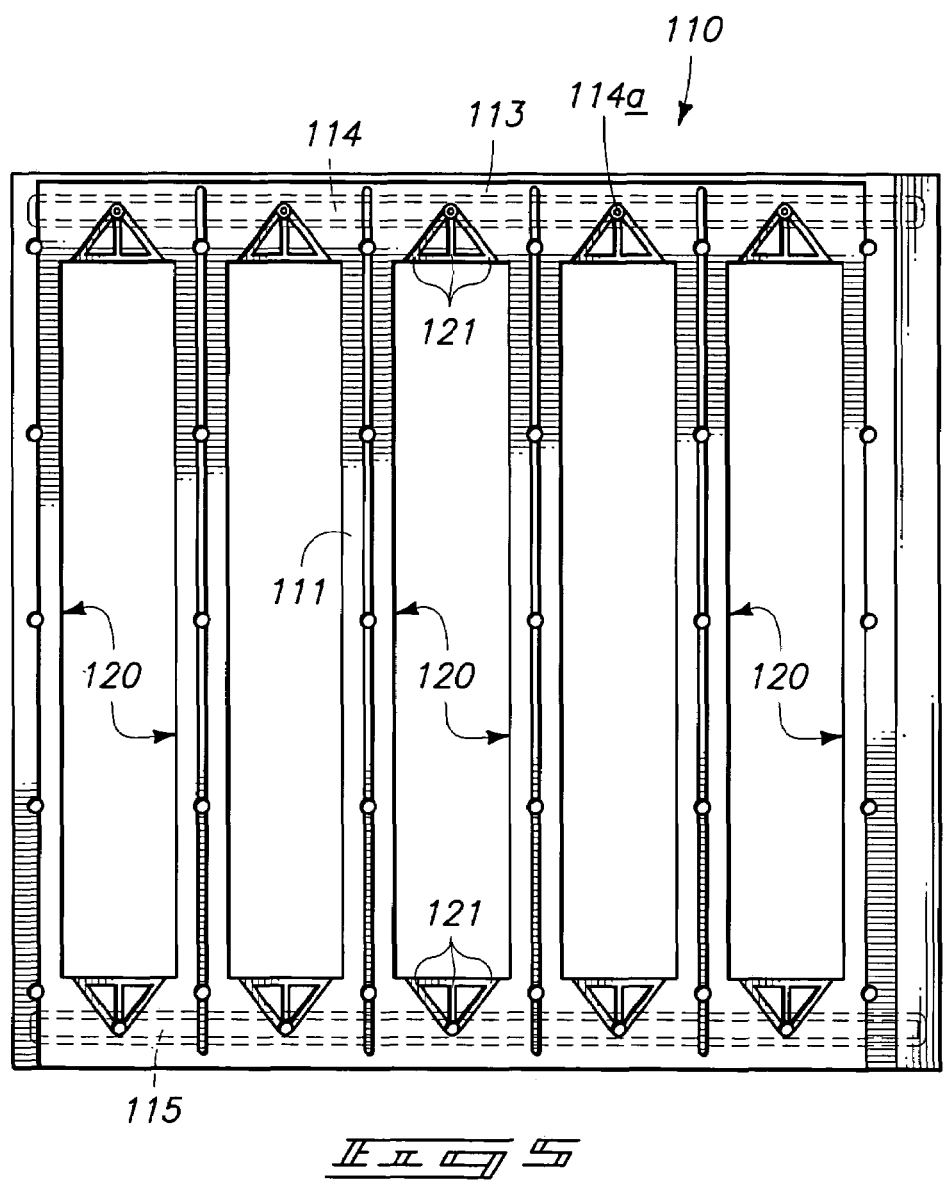
FIG. 5 is a fragmentary, side elevational view of a fuel distribution assembly utilized with the ion exchange membrane fuel cell module.
Figure 6:
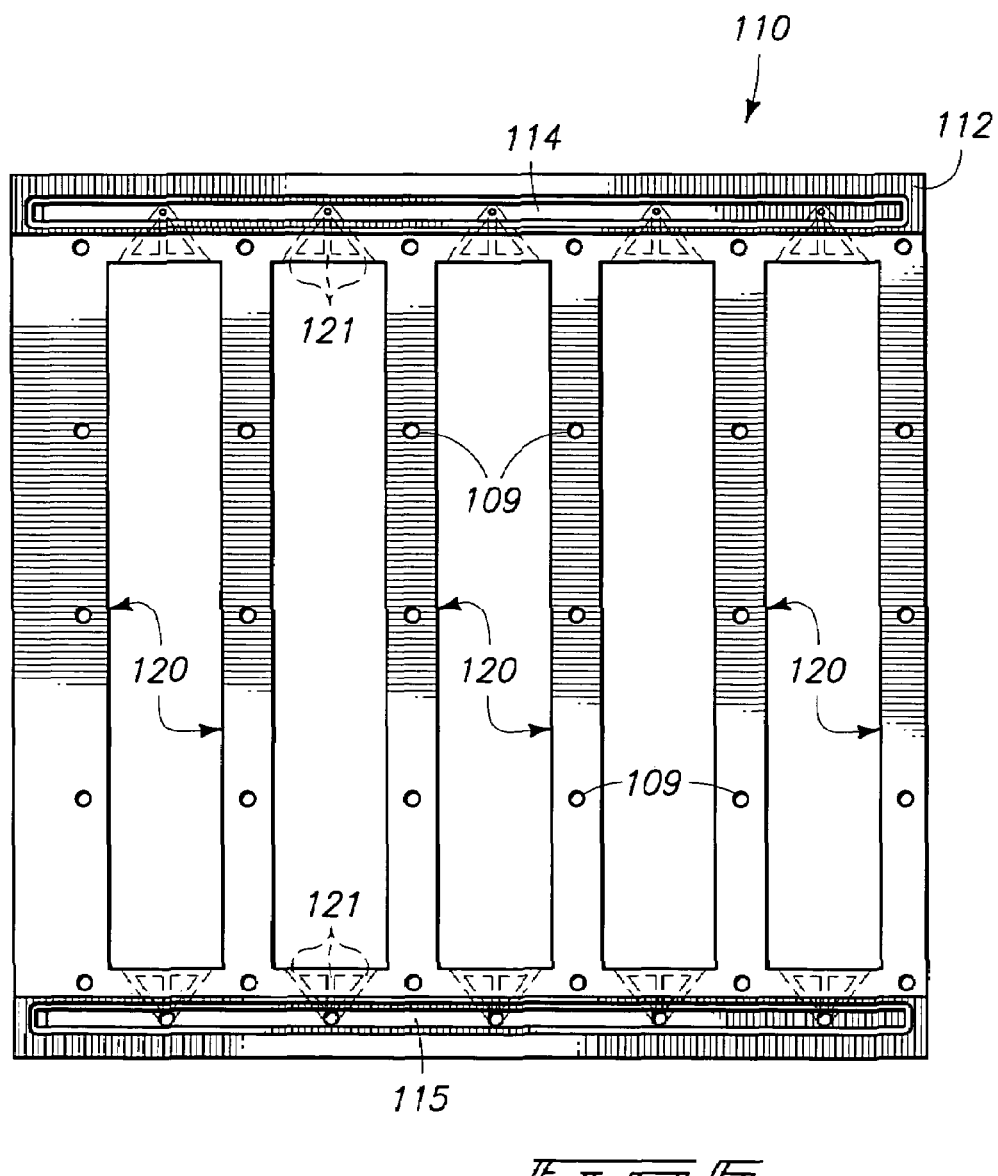
FIG. 6 is a second, fragmentary, side elevational view of the fuel distribution assembly taken from a position opposite to that seen in FIG. 5.

As best seen by reference to FIGS. 5, 6 and 7, a fuel distribution assembly, which is generally indicated by the numeral 110, is coupled in fluid flowing relation relative to the anode side 101 of each of the membrane electrode diffusion assemblies 100. Each fuel distribution assembly 110 is coupled with a source of a fuel 341 and/or 342 (FIG. 8) which may be substantially pure, or which is diluted to various degrees. Such may be achieved if the fuel cell power system 5 was coupled with a reformer which would produce a stream of hydrogen from a source of hydrocarbon such as gasoline, natural gas, propane, etc. If the fuel cell power system 10 was fabricated in the nature of a proton exchange membrane fuel cell, the dilute fuel supply would include hydrogen. The concentration of the hydrogen in the dilute fuel would normally be in a range of about 30% to about 80% by volume.

Figure 8:
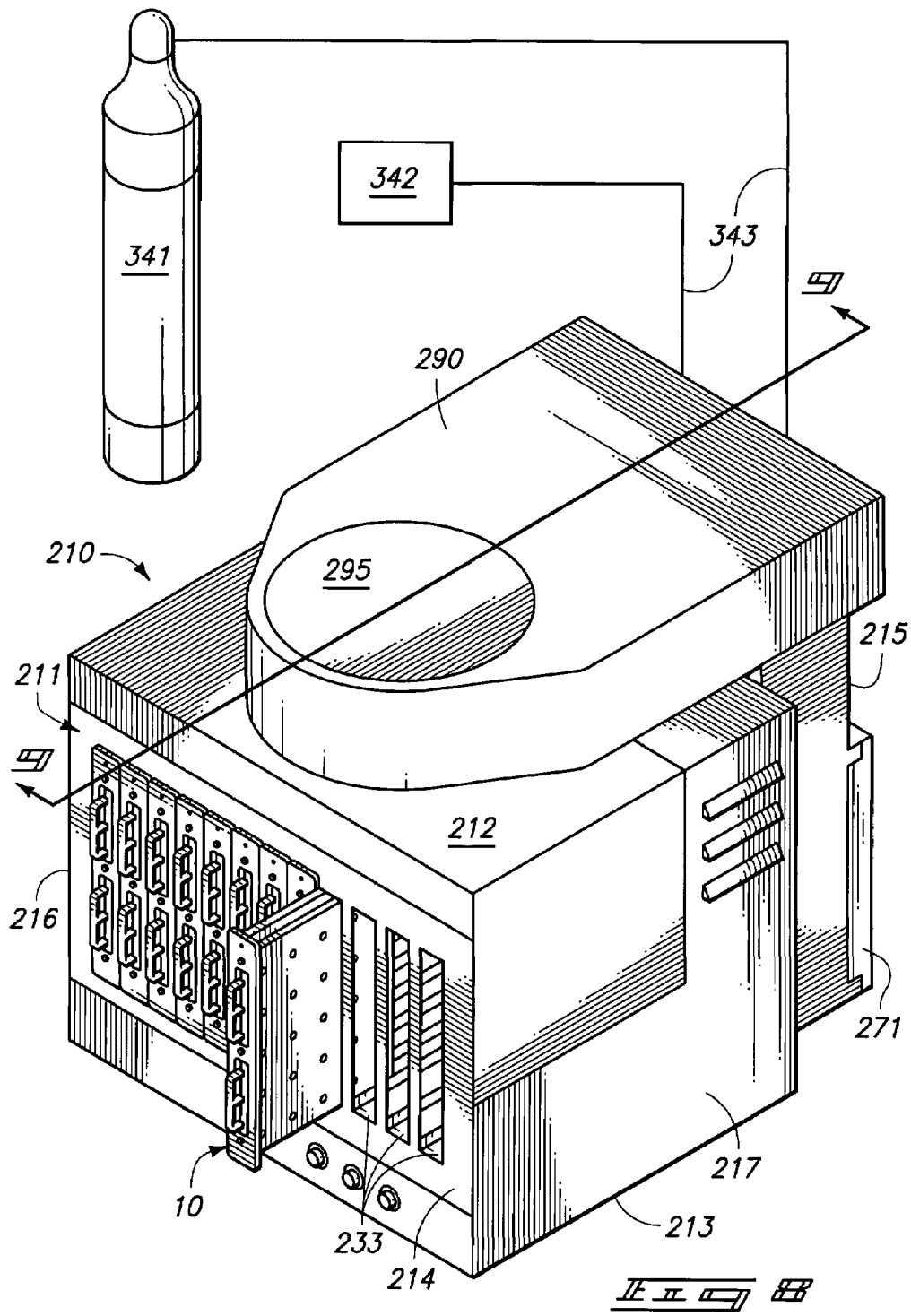
FIG. 8 is a perspective view of an ion exchange membrane fuel cell subrack and associated fuel gas supply.

When supplied with this dilute fuel mixture (regardless of the type), the main body of the fuel cell modules 11 produce an average current density of at least about 350 mA per square centimeter of surface area of each anode side 101 at a nominal voltage of 0.5 volts. Further, the interlinking channels 104 formed in the surface of the anode side 101 facilitate the distribution of the dilute fuel substantially about the entire surface area of the anode side 101. In this arrangement, if contaminants are introduced by way of the dilute fuel mixture or other blockage occurs, the interlinking channels 104 provide a convenient passage by which the fuel may reach substantially the entire surface area of the anode side 101, even though some portions of the interlinking channels 104 may be blocked or otherwise substantially occluded. As noted above, the dilute fuel may be supplied by a reactor 342 (FIG. 8) which receives a hydrocarbon based fuel, and then through a chemical reaction fractionates the hydrocarbon source to liberate a dilute stream of hydrogen which is mixed with other substances. In the alternative, the fuel may be supplied by a pressurized container 341. These alternative arrangements are shown in FIG. 8.

As best seen in FIGS. 5 and 6, each of the fuel distribution assemblies 110 include a main body 111 which has an inside facing surface 112, (FIG. 6) and an outside facing surface 113 (FIG. 5). The main body 111 further defines an intake plenum 114, and an exhaust plenum 115. Further, a fluid coupling 116 (FIG. 1) is mounted in fluid flowing relation relative to the individual intake and exhaust plenums 114 and 115 respectively. A reduced dimension orifice 114*a* (FIG. 5) is formed in the main body and communicates with the intake plenum. This reduced diameter orifice operates to create a pressure differential in the respective apertures or cavities 120 during certain operational conditions to facilitate the clearance of contaminants or other obstructions which may be blocking any of the channels 104 which are formed in the membrane electrode diffusion assembly 100. A plurality of cavities or apertures 120 are formed in the main body 111, and extend between the inside and outside facing surfaces 112 and 113, respectively. The cavities or apertures 120 are disposed in spaced relation, one to the other, and when assembled, the cavities 120 receive the individual membrane electrode diffusion assemblies 100. As best seen in FIG. 5, a plurality of channels or passageways 121 are formed in the main body 111, and couple the individual cavities 120 in fluid flowing relation with the respective intake and exhaust plenums 114 and 115. Additionally, a plurality of fastener apertures 109 are formed in the main body. As further seen in FIG. 7, a sealing member 122 lies in covering relation relative to the individual channels 121.

As best seen in FIG. 1, a plurality of conduits 150 couple in fluid flowing relation the fuel coupling 40 with the fuel distribution assembly 110. Two of the conduits designated as 151 allow a dilute fuel mixture to be delivered by way of the intake plenum 114 to the individual membrane electrode diffusion assemblies 100. Thereafter, any remaining fuel, and associated by-products of the chemical reaction are received back into the exhaust plenum 115 and then flow by way of conduits 152 to the fuel coupling 40 and then to the exhaust passageway 44.

First and second pressure sensitive adhesive seals 123 and 124, respectively are provided, and are disposed in juxtaposed relation relative to the opposite inside and outside facing surfaces 112 and 113, respectively. Each of the seals 123 and 124 have apertures 125 formed therein which are substantially coaxially oriented relative to the respective cavities 120. As will be recognized, the cavities 120 which are formed in the main body 111 of the fuel distribution assembly 110, matingly cooperate and are substantially coaxially aligned with the individual cavities 34 which are formed in the nonconductive support plate 20. As will be recognized, and following the assembly of same, the respective membrane electrode diffusion assemblies 100 are individually received in mating relation in each of the cavities 120 and 34 which are defined by both the fuel distribution assembly 110, and the support member 20. Further, a plurality of fastener apertures 126 are formed in the individual seals 123, and 124, and are operable to receive fasteners which will be discussed in greater detail hereinafter.

Lying in immediate juxtaposed relation relative to the second pressure sensitive adhesive seal 124 is an anode current collector which is generally designated by the numeral 140. Additionally, and as seen in FIG. 7, a substantially rigid sealing plate 130 is provided and which is juxtaposed relative to the cathode side 102 of the membrane electrode diffusion assembly 100. The sealing plate 130 has a main body 131 which defines a plurality of apertures 132 which matingly receive, in part, the respective membrane electrode diffusion assemblies 100. Still further, the main body has a plurality of fastener apertures 133 formed therein and which when assembled, are substantially coaxially aligned with the aforementioned fastener apertures formed in the earlier described portions of the fuel cell module 11.

Each anode current collector 140 lies in ohmic electrical contact against the anode side 101 of each of the membrane electrode diffusion assemblies 100 and further is oriented in heat receiving relation relative thereto. The anode current collector 140 has an electrically conductive main body 141, which has an inside facing surface 142, which lies against the anode side 101 of the membrane electrode diffusion assembly 100, and an opposite outside facing surface 143. Still further, a plurality of fastener apertures 144 are formed in the main body 131 and are operable to be substantially coaxially aligned relative to the other fastener apertures 126 formed in the various seals 123,124, and in the fuel distribution assembly 110.

As seen in FIG. 7, an electrically insulative member or gasket 160 is mounted or oriented in juxtaposed relation relative to the outside facing surface 143 of the anode current collector 140. This insulative member has a main body 161 which has an inside facing surface 162 which rests in contact with the outside facing surface 143 of the anode current collector, and further has an outside facing surface 163. Further, a plurality of fastener apertures 164 are operable to be coaxially aligned with the previously described fastener apertures formed in the remaining parts of the ion exchange membrane fuel cell power system 5.

As best seen in FIG. 7, an anode heat sink 170 is oriented in juxtaposed relation relative to the insulative member 160, and further, is mounted in heat receiving relation relative to the anode sides 101 of each of the membrane electrode diffusion assemblies 100 to conduct heat energy generated by the ion exchange membrane module 11 away from the membrane electrode diffusion assembly 100. In this arrangement, the fuel distribution assembly 110 is located substantially between the anode side 101 of the membrane electrode diffusion assembly 100, and the anode current collector 140. The anode heat sink 170 has a main body 171 which has an inside facing surface 172, which lies in juxtaposed relation relative to the insulative member 160, and an opposite outside facing surface 173. Similarly, and as discussed above, numerous fastener apertures 174 are formed therein, and which are substantially coaxially aligned with the remaining fastener apertures which are formed in the earlier disclosed portions of the ion exchange membrane fuel cell module 10. Fasteners 175 are provided and are received in these coaxially aligned fastener apertures such that the module is held firmly together. These fasteners 175 along with the respective current collectors 60 create pressure sufficient to allow the individual current collectors 60 and 140 to make effective ohmic electrical contact with the anode and cathode sides 101 and 102 respectively of the membrane electrode diffusion assembly 100. As will be recognized from the discussion above, the anode current collector 140 is substantially electrically isolated from the anode heat sink 170. Additionally, the anode heat sink has sufficient thermal conductivity such that it substantially inhibits the formation of a temperature gradient across the membrane electrode diffusion assembly 100 during operation of the ion exchange membrane fuel cell module 10.

A handle assembly is generally indicated by the numeral 190 and is best seen in FIG. 2. As shown therein, the handle assembly 190 has a back plate generally indicated by the numeral 191, and which is defined by a front surface 192, and an opposite rear surface 193. Formed through the front and rear surfaces is an aperture 194 which matingly receives the member 84 which is mounted on the main body 81 of the current conductor assembly 80. Still further, a pair of handles 195 are fastened on the front surface 192, and additionally, a plurality of fastening apertures 196 are formed through the front and rear surfaces 192 and 193 and are operable to receive fasteners 197 which threadably engage the fastener apertures 31, which are formed in the forward edge 23 of the support member 20. The handles permit the module 10 to be easily manipulated by hand, and removed without the use of any tools, when utilized with a subrack or sub-system which will be discussed in greater detail hereinafter.

Figure 9:
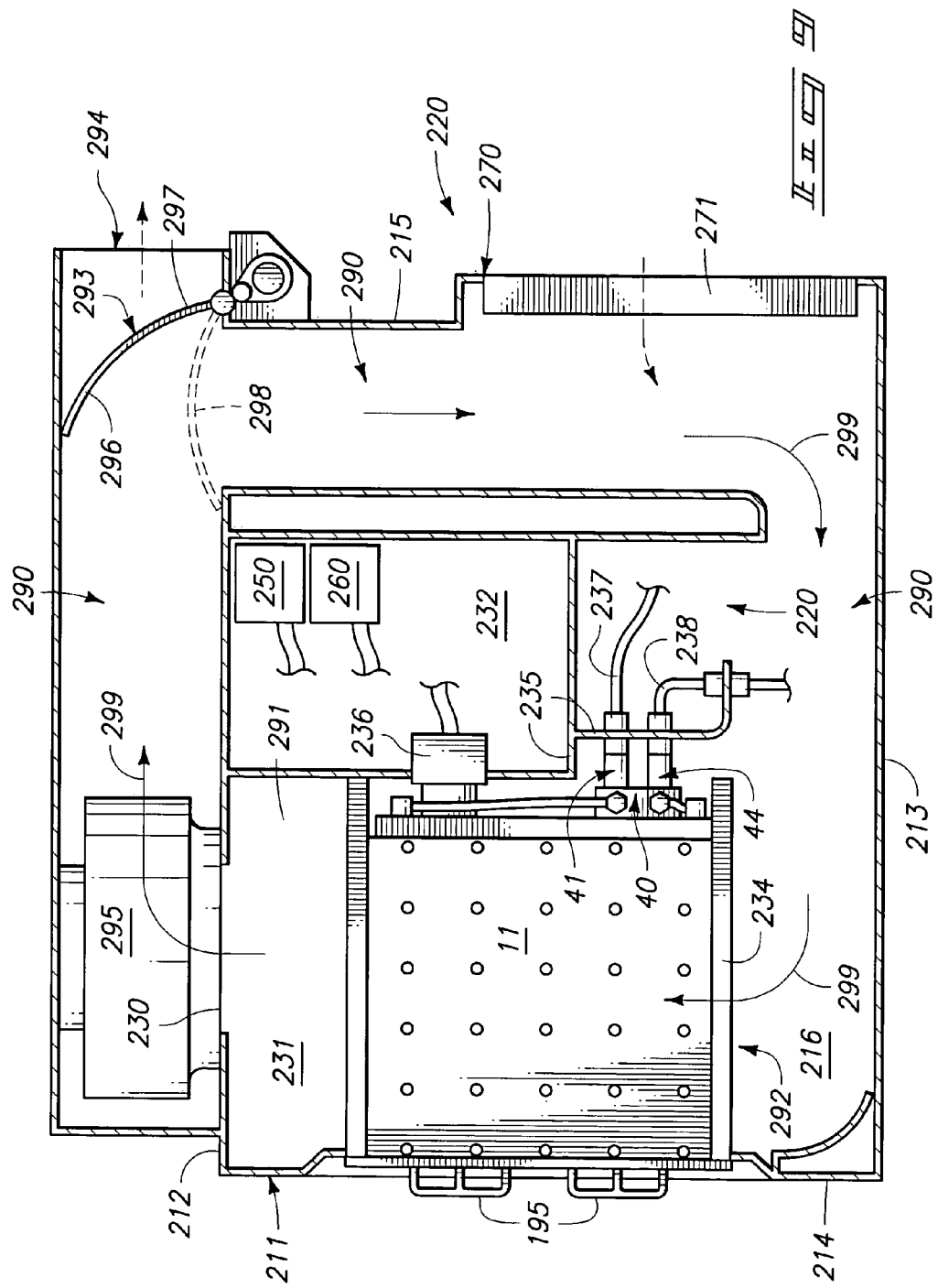
FIG. 9 is a fragmentary, transverse, vertical sectional view taken from a position along line 8-9 of FIG. 8.

The ion exchange membrane fuel cell power system 5 includes a plurality of subracks or sub-systems 210, only one of which is shown in FIGS. 8 and 9, and which is generally indicated by the numeral 210. Each subrack 210 releasably supports a plurality of ion exchange membrane fuel cell modules 10 in an operable arrangement. Each subrack 210 includes a principal enclosure 211. The principal enclosure is defined by a top surface 212; bottom surface 213; front sidewall 214; rear sidewall 215; left sidewall 216, and right sidewall 217. The respective sidewalls 212 through 217 define an internal cavity 220 (FIG. 9). In this arrangement, the principal enclosure will receive multiple fuel cell modules 10, each enclosing a membrane electrode diffusion assembly 100.

As seen in FIG. 8, the ion exchange membrane fuel cell power system 5 is configured in a manner where at least one of the fuel cell modules 10 can be easily removed from at least one of the subracks 210 by hand, while the remaining modules continue to operate. As noted above this removal is normally accomplished without the use of any tools, however it may be necessary in some commercial or industrial applications where vibration, and other outside physical forces may be imparted to the system, to use threaded fasteners and the like to releasably secure the individual modules to the subrack 210 to prevent the unintentional displacement or dislocation of the respective modules from the subrack 210. If utilized, the hand tools which will be employed will be simple hand tools, and the removal will be accomplished in minutes, as opposed the prior art stack arrangements where replacement of a damaged membrane electrode assembly (MEA) may take hours to accomplish. It should be understood that the terms "subrack" and "subsystem" as used in the following claims do not necessarily imply that a rack or shelf is required, only that the subsystem, or a portion thereof, is operable independently whether or not other sub-system, or a portion thereof, of the fuel cell power system 5 are functioning.

As best seen by reference to FIG. 9, an aperture 230 is formed in the top surface 12 of the subrack 210, and further, the cavity 220 is comprised of a first or fuel, cell module cavity 231, and a second cavity or electrical control bay 232. As best seen by reference to FIG. 8, a plurality of individual module apertures 233 are formed in the front surface 214 of the principal housing 211, and are operable to individually receive the respective fuel cell modules 10, and position them in predetermined spaced relation, one to the other.

The fuel cell module cavity 231 is further defined by a supporting member or shelf 234 (FIG. 9) which orients the individual fuel cell modules 10 in a predetermined substantially upright orientation within the cavity 231. Additionally, the fuel cell module cavity 231 is defined by a rear wall 235 which supports a DC bus 236 in an orientation which will allow it to releasably, matingly, electrically couple with the current conductor assembly 80 (FIG. 2) which is borne by the fuel cell module 10. Yet further, and as seen in the cross sectional view of FIG. 9, the rear wall 235 further supports a fuel supply line 237 and a byproduct removal line 238. These are operable to be releasably coupled in fluid flowing relation with respect to the fuel delivery passageway 41 and the exhaust passageway 44 of the fuel coupling 40.

As best seen in FIG. 9, the second cavity or electrical control bay 232 encloses a digital or analog controller 250 which is electrically coupled with the respective ion exchange membrane fuel cell modules 10, and a power conditioning assembly 260 which is electrically coupled with the DC bus 236, and the controller 250, and which is operable to receive the electrical power produced by the ion exchange membrane fuel cell modules 10. The operation of the controller 250 and power conditioning assembly 260 and related control circuitry is discussed in our prior U.S. application Ser. Nos. 09/108,667 (now U.S. Pat. No. RE39,556) and 09/322,666 (now U.S. Pat. No. 6,387,556), which are incorporated by reference herein, except that operation of the controller 250 as it relates to opening and closing subracks 210 is discussed below in greater detail.

As further seen in FIG. 9, an aperture 270 is formed in the rear wall 215 of the principal enclosure 211, and is operable to receive an air filter 271 which is operable to remove particulate matter from an outside ambient air stream passing therethrough and into the principal enclosure 211.

As best seen by the cross sectional view in FIG. 9, the subrack 210 includes an air distribution plenum 290 which is coupled in fluid flowing relation relative to each of the ion exchange membrane fuel cell modules 10. The air distribution plenum 290 has a first or intake end 291 which receives both air which has previously come into contact with each of the ion exchange fuel cell modules 10, and air which comes from outside of the respective ion exchange membrane fuel cell modules. Further, the air distribution plenum has a second or exhaust end 292 which delivers an air stream to each of the ion exchange fuel cell modules 10. Disposed intermediate the first or intake end 291, and the second or exhaust end 292 is an air mixing valve 293 which is coupled to the air distribution plenum 290, and which meters the amount of air which is passed through the respective ion exchange membrane fuel cell modules 10 and is recirculated back to the ion exchange fuel cell membrane modules and by way of the air filter 271. As illustrated, the mixing valve 293 selectively occludes an aperture 294 which is formed in the rear wall 215 of the subrack 210.

An air movement assembly such as a fan 295 is provided, and is mounted along the air distribution plenum 290. As shown in FIG. 9, the air movement assembly 295 is positioned near the intake end 291, and is substantially coaxially aligned with the aperture 230 which is formed in the top surface 212 of the subrack 210. The air mixing valve and the fan assembly 293 and 295 respectively are electrically coupled with the controller 250 and are controlled thereby. The air mixing valve 293 comprises a pivotally movable valve member 296 which can be moved from a first occluding position 297 relative to the aperture 294, and a second, substantially non-occluding position 298 as shown in phantom lines.

As will be recognized, when the valve member 296 is in the second non-occluding position, air received in the intake end 291 and which has previously passed through the individual fuel cell modules will pass out of the principal enclosure 211 and then be exhausted to the ambient environment. On the other hand, when the valve member 296 is in the occluding position 297 air from the intake end 291 which has passed through the fuel cell module 10 will return to the exhaust end and then pass through the modules 10 and return again to the intake end. As will be recognized, by controlling the relative position of the valve member 296, temperature as well as relative humidity of air stream 299 can be easily controlled. Still further, in the occluding position 297, air from ambient will continue to enter the air distribution plenum by way of the air filter 270.

More specifically, the, air stream 299 which is supplied to the fuel cell modules is provided in an amount of at least about 5 to about 1000 times the volume required to support a fuel cell chemical relation which produces water vapor as a byproduct. The present air plenum arrangement provides a convenient way by which the air stream delivered to the cathode side 102 can be humidified by the water vapor generated as a byproduct of the chemical reaction taking place on the cathode. Additionally, during cold operating conditions, this same air, which has now been heated by each of the fuel cell modules 10, will contribute in bringing the entire fuel cell up to normal operating temperatures. Further, the air mixing valve 293 limits the amount of air which has previously passed through the modules 10 and which is added to the air distribution plenum 290. This resulting recirculated air stream and fresh ambient air forms an air stream having substantially optimal operating characteristics which maximizes the current densities and outputs of the respective membrane electrode diffusion assemblies enclosed within each of the fuel cell modules 10.

Referring now to FIG. 10, what is shown is a greatly simplified, exaggerated, partial, and cross-sectional view of an ion exchange membrane fuel cell module 10 which is positioned in an operational relationship relative to the air distribution plenum 290. This particular sectional view, which does not include many of the subassemblies previously discussed, is provided to illustrate the principals that will be set forth below. As seen in FIGS. 9 and 10, and as discussed above, the subrack 210 includes an air distribution plenum 290 which provides a stream of air 299 to each of the ion exchange fuel cell modules 10 which are received in an operational position on the shelf or supporting member 234.

The air stream 299 exits from the exhaust end 292 and then becomes a bifurcated air flow which is generally indicated by the numeral 320. The bifurcated air flow 322 comprises a first cathode air stream 321, which is received in the respective ion exchange membrane fuel cell modules 10; and a second anode heat sink air stream which is generally indicated by the numeral 322. As will be recognized by a study of FIG. 10, the first cathode air stream 321 enters the ion exchange membrane fuel cell module 10, and is further bifurcated into a first component 323 which moves along one of the cathode air passageways 106 which is defined on one side of the support member 20. Further, the first cathode air stream 321 has a second component 324 which passes along the cathode air passageway 106 on the opposite side of the support member 20. As will be appreciated, the bifurcated cathode air stream 321 provides the necessary oxidant (oxygen, in the ambient air stream) to the cathode side 102 of the membrane electrode diffusion assembly 100. Yet further, the cathode air flow operates to remove less than a preponderance of the heat energy generated by the membrane electrode diffusion assembly 100 while it is in operation. As will be recognized the cathode air flow is facilitated by the respective cathode current collectors 60 which create in part, the cathode air passageway 106.

The anode heat sink air stream 322 is further bifurcated into a first component 325 and a second component 326, both of which individually move along the opposite sides 16 of the ion exchange membrane fuel cell module 10, and over each of the anode heat sinks 170. As the anode heat sink air stream components 325 and 326 move over the opposite anode heat sinks 170, the anode heat sink air stream operates to remove a preponderance of the heat energy generated by the ion exchange membrane fuel cell module 10 during operation. Therefore, it will be recognized that the present invention provides an ion exchange fuel cell module 10 which has a bifurcated air flow 320 which regulates the operational temperature of the ion exchange membrane fuel cell module by removing the heat energy generated therefrom.

Referring now to FIG. 8, and as earlier discussed, the individual ion exchange membrane fuel cell modules 10 and the subrack 210 comprise, in combination, a fuel cell power system 5 which is coupled in fluid flowing relation relative to a source of a substantially pure or dilute fuel generally indicated by the numeral 341 and/or 342. The fuel gas supply may comprise a source of bottled and compressed fuel gas generally indicated by the numeral 341, or a fuel stream which is provided by a chemical reactor, or reformer 342 which produces the fuel stream for use by the individual ion exchange fuel cell modules 10. A conduit 343 couples either fuel gas supply 341 or 342 with the respective ion exchange fuel cell modules 10 and the associated subrack 210. When a chemical reformer 342 is provided, the reformer would receive a suitable hydrocarbon stream such as natural gas, propane, butane, and other fuel gases and would thereafter, through a chemical reaction release a fuel stream which would then be delivered by way of the conduits 343.

The present fuel cell power system 5 may also include a fuel gas recovery and recycling system (not shown) which would recover or recapture unreacted fuel gas which has previously passed through the individual ion exchange fuel cell modules 11. This system, in summary, would separate the unreacted fuel gas and would return the unreacted fuel gas back to the individual ion exchange fuel cell modules for further use. This recovery system would be coupled with the byproduct removal line 238.

Referring to FIGS. 11 and 12, switching circuitry 400 is provided for each subrack or subsystem 210. As earlier discussed, each subrack or subsystem includes a plurality of fuel cells or fuel cell modules 10. Each of these fuel cell modules 10 and subsystems 210 have a corresponding nominal voltage output. In the arrangement as seen in FIG. 11, the nominal voltage outputs of each of the respective subsystems 210 are substantially similar. For purposes of this application, a substantially similar nominal voltage of the plurality of subsystems (each including a plurality of fuel cell modules 10) would be a voltage which is less than about 10% of optimal voltage of the other subsystems 210. It should be understood that this switching circuitry also works particularly well with the fuel cell arrangement shown in U.S. Pat. No. 6,030,718. This fuel cell arrangement includes subracks similar to that described in this application. The depicted DC-DC switching circuitry 400 includes an input comprising input terminals 420, 422, circuitry 408; and an output terminal 421. Input terminals 420, 422 are configured to couple in parallel with the individual fuel cell sub-systems 210. Terminal 420 comprises a positive DC terminal and terminal 422 comprises a negative DC or ground terminal. The terminals 420 are electrically isolated from the several subsystems which are shown.

Switching circuitry 400 is configured to couple selected fuel cell subsystems 210 to an energy storage device 412 (FIG. 11). The electrical energy storage device 412 comprises one or more batteries, capacitors, super-capacitors, ultra-capacitors or a combination of one or more batteries with one or more of the capacitor types described above. More particularly, terminals 421 and 422 are respectively coupled in parallel to negative and positive terminals 424 and 425 of the energy storage device 412. In addition to performing a switching function, circuitry 408, in one embodiment, is configured to convert direct current electrical energy having a variable voltage from one of the sub-system 210, into direct current electrical energy having a substantially constant voltage at the terminals 424 and 425. In FIGS. 11 and 12 terminals 422; 424; and 423 are substantially at the same potential.

As shown in FIG. 11, the fuel cell power system 5 includes, in one embodiment, a power conditioning device 426 having DC inputs 427 and 428 coupled to the energy storage device 412 and electrical outputs 429 and 430 selectively coupled to a load. The power conditioning device 426 allows the fuel cell power system 5 to be used with, for example, household AC systems or other appliances.

As shown in FIG. 12, the depicted arrangement of circuitry 400 comprises a switch 414. In one embodiment, switch 414 comprises a metal oxide semiconductor field effect transistor (MOSFET). Switch 414 is configured to selectively couple one fuel cell subrack or sub-system 210 with electrical energy storage device 412. Multiple switching circuitry 400 is provided to couple a plurality of fuel cell subracks with the electrical energy storage device 412. More particularly, in one embodiment, a circuit 400 is provided for each module 10 of each subrack 210.

In the described embodiment, controller 250 is configured to monitor at least one operational parameter of the fuel cell power system 5 and to control switch 414 responsive to the monitoring. For example, controller 250 is configured to monitor a voltage of electrical energy storage device 412. Responsive to the monitoring, controller 250 operates switch 414 to selectively couple terminal 420 with node 416 for selected fuel cell subracks or sub-assemblies of fuel cell 218 to charge electrical energy storage device 412. For example, if the voltage of the energy storage device 412 decreases, due to an increase in load, the controller may bring one or more additional subracks on line and couple them to the electrical energy storage device 412.

The energy storage device 412 has a nominal voltage substantially similar to the optimal voltage of the fuel cell 218. In this regard, a substantially similar voltage would be one which within less than about 10% of optimal voltage of the fuel cell. Still further, in an exemplary application, it is desired to provide a substantially constant direct current voltage of a predetermined amount between output terminals 421, and 423. Accordingly, it is desired to provide a direct current voltage potential which is just slightly greater across terminals 416 and 422 to account for the voltage drop across a diode 418. In the embodiment shown in FIG. 11 the energy storage device 412 has a nominal voltage of greater than about 12 Volts DC, which is substantially identical to the D.C. output across terminals 421, and 423. In certain embodiments the diode 418 may be eliminated.

In one embodiment, the controller 250 controls the coupling of the fuel gas supply 341 and/or 342 to the individual subracks 210 which are selected to be coupled to the energy storage device 412. In this arrangement fuel gas is supplied only to the subracks 210 that are coupled to the energy storage device. A separate controlled fuel gas supply 341 or 342 may be provided for each subrack 210 in one alternative embodiment. In yet a further embodiment, a common gas supply is coupled to all or multiple subracks 210 but supply to each subrack is individually controllable, e.g., by an electronic valve controlled by the controller 250. Moreover in one of the embodiments, when the controller 250 decides to bring an additional subrack 210 on-line for coupling to the energy storage device 412, sufficient time is provided for that subrack to come up to standard operating voltage before it is coupled to the energy storage device 412. Thus, the fuel gas supply 341 and/or 342 may be provided to the subrack 210 before that subrack is coupled to the energy storage device 412. When the controller decides to take a subsystem or a subrack 210 off-line, it is decoupled from the energy storage device 412 either simultaneously with decoupling of the gas supply from the subrack 210 or before or after decoupling of the gas supply.

Although a certain number of subsystems or subracks 210 are shown in the drawings, and a certain number of fuel cell modules 10 are shown per subrack 210 in the drawing, it will be readily apparent that any desired number of subsystems or subracks and modules 11, or a portion thereof, could be employed in alternative embodiments.

Operation

The operation of the described embodiment of the present invention is believed to be readily apparent and is briefly summarized at this point.

An ion exchange membrane fuel cell power system 5 includes multiple modules 10 each enclosing at least one membrane electrode diffusion assembly 100, and wherein at least one of the modules 10 can be easily removed from the ion exchange membrane fuel cell power system, by hand, while the remaining modules continue to operate.

FIGS. 13A, 13B and FIG. 13C together illustrate operation of the controller 250 and system 5 described above.

In step S1, the controller 250 is powered up (booted up).

In step S2 variables are initialized (e.g., thresholds or setpoints are defined), and all switches 414 are opened to decouple the sub-systems 210 from the energy storage device 412. After performing step S2, the controller 250 proceeds to step S3.

In step S3, the voltage of the charge storage device 412 is measured, and the status and availability of each sub-system 210 is checked. After performing step S3, the controller 250 proceeds to step S4.

In step S4, a determination is made as to whether the measured voltage is less than a first threshold "SETPOINT 4" indicative of a very low voltage of energy storage device 412. If so, the controller proceeds to step S5. If not, the controller proceeds to step S7.

In step S5, all the sub-systems 20 are de-coupled from the energy storage device 412. After performing step S5, the controller 250 proceeds to step S6.

In step S6, the controller 250 asserts a signal to shut off the power conditioning device 426 or otherwise disconnect the fuel cell power system 5 from the load.

In step S7, a determination is made as to whether the measured voltage is greater than or equal to a second threshold "SETPOINT 1" which is indicative of a high voltage at energy storage device 412. If so, the controller 250 proceeds to step S8. If not, the controller proceeds to step S10 (FIG. 13B).

In step S8 (FIG. 13A), a determination is made as to whether all sub-systems 210 are de-coupled from the energy storage device 412. If so, the controller 250 proceeds to step S18 (FIG. 13C). If not, the controller 250 proceeds to step S9.

In step S9, all of the sub-systems are decoupled from the energy storage device 412 (since the voltage at the energy storage device is high). After performing step S9, the controller 250 proceeds to step S18 (FIG. 13C).

In step S10 (FIG. 13B), a determination is made as to whether the measured voltage is greater than or equal to a third threshold "SETPOINT 2" which is indicative of a moderately high voltage at the energy storage device 412. If so, the controller 250 proceeds to step S11. If not, the controller 250 proceeds to step S13.

In step S11, a determination is made as to whether all sub-systems 210 are de-coupled from the energy storage device 412. If so, the controller 250 proceeds to step S3 (since there are no sub-systems 210 to electrically decouple from the energy storage device 412). If not, the controller 250 proceeds to step S12.

In step S12, one of the sub-systems 210 coupled to the energy storage device 412 is de-coupled from the energy storage device 412 (since the voltage is moderately high, there are more sub-systems 210 coupled to the energy storage device 412 than necessary, so one will be decoupled). The controller then proceeds to step S3.

In step S13, a determination is made as to whether the measured voltage is greater than or equal to a fourth threshold "SETPOINT 3" indicative of a moderately low voltage. If so, the controller 250 proceeds to step S14. If not, the controller proceeds to step S16.

In step S14, a determination is made as to whether all sub-systems 210 are coupled to the energy storage device 412. If so, the controller 250 proceeds to step S3 (since there are no additional sub-racks 210 available to be coupled to the energy storage device 412). If not, the controller 250 proceeds to step S15.

In step S15, one of the sub-systems 210 that is de-coupled from the energy storage device 412 is coupled to the energy storage device 412. After performing step S15, the controller 250 proceeds to step S3.

In step S16, indicative of a low voltage, a determination is made as to whether all sub-systems 210 are coupled to the energy storage device. If so, the controller 250 proceeds to step S3 (since there are no additional sub-systems 210 that can; be coupled to the energy storage device 412 to raise the voltage). If not, the controller 250 proceeds to step S17.

In step S17, all sub-systems 210 are coupled to the energy storage device 412. Following this step the controller proceeds to step S3.

Referring now to FIG. 13C in step S18 a determination is made regarding whether an a power conditioner remote shut-off signal has been asserted. If so, the controller proceeds to step S19, if not the controller 250 proceeds to step S3. In step S19 a determination is made whether a given time delay is complete, if so, the controller proceeds to step S20, if not the controller proceeds to step S3. In step S20 the controller clears the remote shut-off signal and then proceeds to step S3.

Thus, an appropriate number of sub-systems 210 are coupled to the energy storage device 412 depending on the voltage of the energy storage device 412. Still further, the energy storage device 412 absorbs sudden spikes in the load without risk of damage to the sub-systems 210 and thus permits the sub-systems 210 some time to come on-line.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fuel cell power system comprising:
a fuel cell which has an optimal voltage;
an energy storage device having a nominal voltage substantially similar to the optimal voltage of the fuel cell; and
an electrical switch that, in operation, selectively electrically couples the fuel cell to the energy storage device to charge the energy storage device.

2. A fuel cell power system as claimed in claim 1, and further comprising a plurality of additional fuel cells respectively having optimal voltages substantially similar to the optimal voltage of the first mentioned fuel cell.

3. A fuel cell power system as claimed in claim 1, wherein the fuel cell comprises multiple fuel cell subracks which selectively support respective fuel cell modules, and wherein the respective fuel cell modules can be operatively removed from the individual subracks while the subracks remain operational.

4. A fuel cell power system as claimed in claim 1, wherein the electrical switch selectively electrically couples the fuel cell to the electrical charge storage device without any intermediate power conditioning or power conversion.

5. A fuel cell power system comprising:
a plurality of fuel cells, the fuel cells respectively having substantially similar nominal voltages;
an energy storage device having a nominal voltage substantially similar to that of each of the fuel cells; and
electrical switching circuitry electrically coupled to the fuel cells and the energy storage device, and wherein the electrical switching circuitry is configured to electrically couple a selectable number of the fuel cells to the charge storage device to maintain the voltage of the charge storage device above a predetermined voltage.

6. A fuel cell power system as claimed in claim 5, wherein the fuel cells are defined by fuel cell stacks.

7. A fuel cell power system as claimed in claim 5, wherein the fuel cells are independently operable.

8. A fuel cell power system as claimed in claim 5, wherein the fuel cells are constructed and arranged so as to be able to be removed and replaced while the fuel cell power system is in operation.

9. A fuel cell power system comprising:
a fuel cell which has a nominal operating voltage;
an energy storage device having a nominal voltage substantially similar to the nominal operating voltage of the fuel cell;
an electrical switch selectively coupling the fuel cell to the energy storage device; and
a controller coupled in voltage sensing relation relative to the fuel cell and the energy storage device, and further coupled in controlling relation relative to the electrical switch, the controller selectively controlling the switch to selectively electrically couple the fuel cell to the energy storage device to maintain the voltage of the energy storage device above a predetermined threshold.

10. A fuel cell power system as claimed in claim 9, wherein the energy storage device comprises a plurality of batteries.

11. A fuel cell power system as claimed in claim 9, wherein the energy storage device comprises a capacitor.

12. A fuel cell power system as claimed in claim 9, wherein the energy storage device comprises a battery and a capacitor.

13. A fuel cell power system as claimed in claim 9, wherein the controller electrically couples the fuel cell to the energy storage device without any intermediate power conditioning or power conversion.

14. A method comprising:
providing a fuel cell having a nominal voltage;
providing an energy storage device having a nominal voltage which is substantially similar to the nominal voltage of the fuel cell and electrically coupling the energy storage device to a load; and
selectively electrically coupling the fuel cell to the energy storage device to substantially maintain the energy storage device above a predetermined voltage threshold.

15. A method according to claim 14, and wherein providing a fuel cell comprises electrically coupling a plurality of selectively removable fuel cell subracks together.

16. A method according to claim 14, and further comprising:
providing a controller coupled in voltage sensing relation relative to the fuel cell and to the energy storage device;
monitoring the voltage of the energy storage device and the voltage of the fuel cell; and
controlling the electrical coupling of the fuel cell to the energy storage device with the controller responsive to the monitoring.

17. A method according to claim 16, and further comprising:
providing a power conditioning device and electrically coupling the power conditioning device to both the energy storage device and the load.

18. A method according to claim 17, and further comprising:
electrically coupling a sensor to the energy storage device to sense the voltage of the energy storage device and the voltage of the fuel cell, and electrically coupling the sensor to the controller.

19. A method according to claim 18, and wherein providing a fuel cell comprises:
providing multiple independently operable fuel cells, and wherein the independently operable fuel cells may become inoperable without causing the remaining fuel cells to be rendered inoperable.

20. A method according to claim 14, and wherein providing a fuel cell comprises:
providing a subrack for releasably supporting a plurality of ion exchange membrane fuel cell modules; and
providing a DC bus which releasably electrically couples with the ion exchange membrane fuel cell modules and electrically coupling the DC bus to the energy storage device.

* * * * *

UNITED STATES PATENT AND TRADEMARK OFFICE
CERTIFICATE OF CORRECTION

PATENT NO. : 7,326,480 B2  
APPLICATION NO. : 10/830929  
DATED : February 5, 2008  
INVENTOR(S) : William A. Fuglevand Page 1 of 1

It is certified that error appears in the above-identified patent and that said Letters Patent is hereby corrected as shown below:

Column 8, line 28, after the paragraph ending with "are shown in FIG. 8.", please insert the following:
  --As best seen by reference to the exploded view shown in Fig. 7 and Fig. 1, the ion exchange membrane fuel cell power system 10 of the present invention includes a pair of the fuel distribution assemblies 110 which are individually mounted in fluid flowing relation relative to the anode side 101 of the respective membrane electrode diffusion assemblies 100.--.

Signed and Sealed this

Twelfth Day of August, 2008

JON W. DUDAS  
*Director of the United States Patent and Trademark Office*